United States Patent
Obrzut et al.

(10) Patent No.: US 11,797,364 B1
(45) Date of Patent: Oct. 24, 2023

(54) SYSTEM AND METHOD FOR CONNECTING XAPI STATEMENTS WITH THIRD PARTY APPLICATIONS USING REPRESENTATIONAL STATE TRANSFER APIS

(71) Applicant: RISC, Inc., Webster, TX (US)

(72) Inventors: Vincent R. Obrzut, League City, TX (US); William Duncan Welder, IV, Galveston, TX (US); Conrad Arthur Werkenthin, Friendswood, TX (US)

(73) Assignee: RISC, Inc., Webster, TX (US)

( * ) Notice: Subject to any disclaimer, the term of this patent is extended or adjusted under 35 U.S.C. 154(b) by 0 days.

(21) Appl. No.: 17/881,502

(22) Filed: Aug. 4, 2022

(51) Int. Cl.
   *G06F 9/54* (2006.01)
   *G06F 18/22* (2023.01)
   *G06F 18/243* (2023.01)

(52) U.S. Cl.
   CPC ............. *G06F 9/547* (2013.01); *G06F 18/22* (2023.01); *G06F 18/24317* (2023.01)

(58) Field of Classification Search
   CPC ..................................................... G06F 9/541
   See application file for complete search history.

(56) References Cited

U.S. PATENT DOCUMENTS

| | | | |
|---|---|---|---|
| 2014/0108665 A1 | 4/2014 | Arora et al. | |
| 2016/0063873 A1 | 3/2016 | Zimmer et al. | |
| 2020/0394930 A1 | 12/2020 | Barab et al. | |
| 2021/0397784 A1 | 12/2021 | Grosse | |
| 2022/0060396 A1 | 2/2022 | Crabtree et al. | |
| 2022/0303348 A1* | 9/2022 | Glaser | H04L 67/561 |
| 2023/0222510 A1* | 7/2023 | Reineke | G06F 9/541 |
| | | | 705/44 |

OTHER PUBLICATIONS

Botan Cosar, A Comparative Analysis of Zapier and IFTTT Through the Lens of Enterprise Integration, Bachelor's Thesis, KTH Royal Institute of Technology, School of Electrical Engineering and Computer Science (EECS), Stockholm, Sweden, Jun. 12, 2021.
xapi.com, Developer Overview, A Technical Guide to Help Developers Get Started Using xAPI, downloaded from the Internet Jul. 4, 2022.
Dave Tosh, Harness Your Learning Locker Data to Automate Events, Jul. 12, 2018.

(Continued)

*Primary Examiner* — Andy Ho
(74) *Attorney, Agent, or Firm* — Terrile, Cannatti & Chambers; Michael Rocco Cannatti

(57) ABSTRACT

A method, system, apparatus and computer program product are disclosed for enhancing operable functionality of xAPI statements by sequentially comparing a plurality of authorized xAPI statements against a plurality of trigger rules with a pattern matching process which evaluates matching xAPI data properties and logical and/or comparative operator requirements from each trigger rule against each authorized xAPI statement to identify matching trigger rules which are evaluated against one or more required trigger rules associated with a first trigger to automatically generate one or more outbound REST API calls to communicate with a third-party application upon detecting that the all the required trigger rules associated with the first trigger are matched by an actor.

20 Claims, 11 Drawing Sheets

(56) References Cited

OTHER PUBLICATIONS learninglocker.net, Learning Locker Documentation, Guides, downloaded from the Internet Jul. 4, 2022.
Yet Analytics, LRSPipe—SQL LRS, Open the power of xAPI Profiles, LRSPipe makes the TLA accessible to everyone, Jun. 2021.
Karla Hesterberg, HubSpot, Inc., The 22 Best iPaas Vendors for Any Budget, Marketing, Aug. 20, 2021.
zapier.com, How it works, screenshots downloaded from the Internet Jul. 4, 2022, https://zapier.com/how-it-works?utm_source=bing&utm_medium=cpc&utm_campaign=bing-usa-nua-search-top_trademark-brand_exact&utm_adgroup=zapier&utm_term=zapier&utm_content=zapier&msclkid=827f9e1dd1a6144b3800fca2ca317841&gclid=.

\* cited by examiner

SYSTEM AND METHOD FOR CONNECTING XAPI STATEMENTS WITH THIRD PARTY APPLICATIONS USING REPRESENTATIONAL STATE TRANSFER APIS

BACKGROUND OF THE INVENTION

Field of the Invention

The present invention is directed in general to field of information processing. In one aspect, the present invention relates generally to integrating learning systems, methods, and apparatuses to automatically process and connect input Experience Application Programming Interface (xAPI) statements with third-party applications using representational state transfer APIs.

Description of the Related Art

Learning management systems are computer-based information processing systems that capture and process analytical data to administer, document, track, report, automate, and deliver educational courses, training programs, or learning and development programs. For example, a learning management system (LMS) may use a software application to identify training and learning data relating to course completion and/or learning gaps, and can support a wide range of uses with online learning delivery platforms which provide online content, including education courses, accreditations, training, customer resource management, and the like. In such applications, the learning experiences of users are often recorded and tracked using the Experience API (xAPI), a standardized e-learning software specification which was developed as a US Department of Defense (DoD) initiative to support interoperability of learning systems by establishing a common approach for recording learning experiences in a Learning Record Store (LRS). The Experience API is an open source specification that uses a Restful web service with a common syntax for JavaScript Object Notation (JSON) statements to store learning data in a consistent way. The web service allows software clients to read and write experiential data in the form of "statement" objects. In their simplest form, xAPI statements are in the form of "actor verb object" triplets (e.g., "I did this"), though more complex statement forms can be used to include additional statement information, such as "extensions," "context" and "result."

While the power of the Experience API is realized by providing a loose structure that gives applications some flexibility in how they describe experience data, the reporting function is an area of xAPI that is technically outside of the scope of the specification, so the xAPI specification stops short of taking action based on the captured data. In particular, existing xAPI tools typically have only limited processing functionality, such as a built-in query API to help filter recorded statements, a full forwarding API that replicates all statements from a source LRS into the target LRS, a statement template filtering API that forwards only an API statement that matches a statement template, and a pattern filtering API that forwards only an xAPI statement that matches a filter pattern. As a result, the xAPI tools are generally not designed for processing the xAPI statements with third-party applications, forcing Learning Experience Designers to design their own systems for processing and integrating the collected xAPI data with non-xAPI systems. Another limitation with existing solutions is that the xAPI processing functionality is typically applied to xAPI statements from a single input LRS source. These limitations in the processing functionality of xAPI statements are compounded by the fact that many xAPI-enabled applications keep their data siloed so that they are not combined or processed with non-xAPI applications, further limiting the ability to take full advantage of the data collected in the xAPI specification. While there are learning systems that include algorithms to make automated recommendations for learning activities based on a user's skill profile or to extract metadata from learning materials to make such recommendations, such systems typically process a single xAPI statement which is challenging to implement. Thus, the existing constraints on available xAPI inputs and processing output functionality means that existing solutions are extremely difficult at a practical level by virtue of the difficulty in accurately retrieving, processing, and combining multiple xAPI statements for integration with third party applications.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 3 illustrates a programming interface screenshot for an example xAPI statement matching rule which defines a plurality of matching properties in accordance with selected embodiments of the present disclosure.

FIG. 4 illustrates a programming interface screenshot for an example xAPI statement matching rule with defined rule context activity information in accordance with selected embodiments of the present disclosure.

FIG. 5 illustrates a programming interface screenshot for an example xAPI statement matching rule with defined rule extensions in accordance with selected embodiments of the present disclosure.

FIG. 6 illustrates a programming interface screenshot for an example outbound REST API call with defined trigger actions in accordance with selected embodiments of the present disclosure.

FIG. 7 illustrates a programming interface screenshot for an example outbound REST API call with defined trigger action properties in accordance with selected embodiments of the present disclosure.

DETAILED DESCRIPTION

Figure 1:
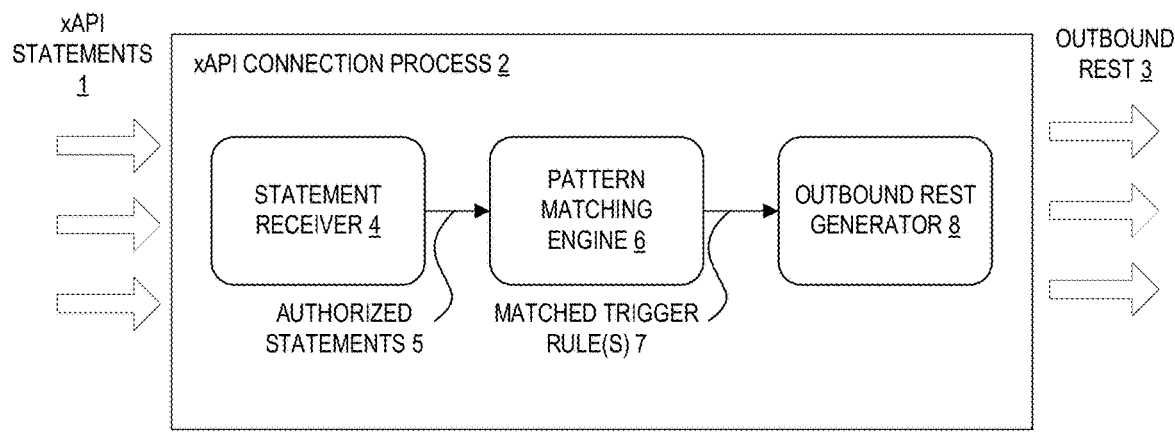
FIG. 1 is a simplified system level architecture block diagram illustrating an xAPI connection process in accordance with selected embodiments of the present disclosure.

A system, apparatus, computer program code, and methodology are described for efficiently receiving and assessing xAPI data from multiple Learning Record Store (LRS) or Learning Record Provider (LRP) sources to improve computer performance and interaction with third party applications by securely receiving xAPI statements received from multiple sources and then assessing the received xAPI data against multiple trigger rules to update third party applications using output representational state transfer (REST) APIs upon determining that defined conditions from the trigger rules are met by the received xAPI data. As disclosed herein, improved processing efficiencies are obtained by using a statement receiver engine to securely, quickly, and efficiently process xAPI statements received from approved LRS sources. In addition, a separate pattern matching engine is connected and configured to analyze the received xAPI statements against a plurality of trigger rules, and to identify and store matched rules in a data store (e.g., database). In selected embodiments, one or more of the trigger rules may include matching property values and/or logical operator requirements that are applied to the xAPI data by the pattern matching engine. In addition, the matching trigger rules are associated with an actor and trigger, either as part of the pattern matching engine or in a separate module. Finally, an outbound REST generator is connected and configured to execute a trigger by sending one or more outbound REST API calls when all of the trigger rules for a trigger are met by an actor. In this way, xAPI data collected from multiple xAPI statement sources can be used to generate outbound REST API calls which update third party applications to automatically provide enhanced processing functionality, such as generating a certification, documenting a competency, updating Human Resource applications, statement forwarding, statement transformation, and even granting access to secured facilities. And by properly structuring and sequencing the order and operation of the statement receiver engine, pattern matching engine, and outbound REST generator, the disclosed system, apparatus, computer program code, and methodology provides an improvement in the functioning of the computer operations for receiving and assessing xAPI data against multiple trigger rules to update third party applications upon determining that required conditions from the trigger rules are met by the received xAPI data.

While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Referring now to FIG. 1, a simplified system level architecture block diagram 10 which illustrates an exemplary xAPI connection process 2 for automatically triggering outbound REST API calls 3 based on detected patterns in xAPI data from input xAPI statements 1 that may be received from multiple different xAPI statement sources. As depicted, the xAPI connection process 2 may include a statement receiver service 4, a pattern matching engine service 6, and an outbound REST generator service 8 which are connected and configured to provide the functionality described herein, though the specific division of functionality between the services 4, 6, 8 can be allocated differently than shown. However, the overall functionality of the xAPI connection process 2 is operative to identify authorized xAPI statements 5 for comparison or matching with pattern(s) specified in one or more matched trigger rules 7, and to make outbound REST calls 3 to existing APIs of other systems, including LRS systems, in response to the matched trigger rule(s) 7, thereby bridging the gap between the input xAPI statements 1 and other enterprise systems which receive the outbound REST calls 3.

In selected embodiments, the xAPI connection process 2 may include a statement receiver service 4 that is configured to process and authenticate xAPI statements 1 that are received from multiple sources, thereby generating authorized statements 5. As will be appreciated, the input xAPI statements 1 can be provided directly to the xAPI connection process 2 by an activity provider (i.e., the system that generates the xAPI statements) and/or by one or more existing LRS systems which include a "statement forwarding" function that forwards statements it receives to another LRS system. Regardless of the source, the xAPI connection process 2 may be configured to identify authorized or approved xAPI sources using any suitable technique, such as by providing credentials to the source for use when sending xAPI statements 1 to the xAPI connection process 2. The statement receiver service 4 may also identify incoming xAPI statements 1 that are duplicates of previously received statements, thereby conserving processing resources. As a result of processing at the statement receiver service 4, authorized xAPI statements 5 are identified, flagged, and stored for additional processing, and may also be stored in local storage (not shown) for subsequent processing. In selected embodiments, the statement receiver service 4 is designed as a separate and extremely fast process to securely, quickly, and efficiently validate xAPI statements 1 received from approved Learning Record Providers (LRP) or LRS sources which can generate thousands of incoming xAPI statements in a short time period.

In addition, the depicted xAPI connection process 2 includes a pattern matching engine service 6 that is configured to analyze the authorized statements 5 against one or more trigger rules, thereby generating matched trigger rule(s) 7. As will be appreciated, the trigger rules may be created by the administrator of the xAPI connection process to specify one or more property values and/or logical operator requirements that are applied to the xAPI data from each authorized statement 5. For example, a specific trigger rule may specify a particular "actor verb object" triplet of property values (e.g., "John completed the course") that must be matched by an authorized xAPI statement 5 for the trigger rule to be matched. Of course, additional xAPI statement information, such as the "extensions," "activity type," "context," and "result," can be used when defining a trigger rule. In such embodiments, the pattern matching engine service 6 may also include processing steps for associating or assigning matching trigger rules to a corresponding actor, though the processing steps for associating or assigning matching rules to actors and triggers may be performed in a separate service, such as the outbound REST generator service 8.

Additional performance benefits are obtained by configuring the pattern matching engine service 6 to apply trigger rules that apply comparison operators (e.g., > (greater than), < (less than), ≥ (greater or equal to), ≤, (less than or equal to) === (equal to), and !== (not equal to)) and/or logical operators (e.g., && (AND), || (OR), and ! (NOT)) to the xAPI data. As disclosed herein, a single trigger may contain multiple trigger rules to be matched against an authorized xAPI statement 5. In addition, the pattern matching engine service 6 may require several authorized xAPI statements 5 for all required trigger rules to be fully met. As a result, the pattern matching engine service 6 may be configured to periodically retrieve authorized xAPI statements 5 from local storage (not shown) for batch processing to capture several authorized xAPI statements 5 that are generated over time. In selected embodiments, the pattern matching engine service 6 is designed as a separate matching process that can be periodically run (e.g., every few minutes) to match groups of authorized xAPI statements 5 with one or more trigger rules and to associate matched trigger rules with actors. As a result, the computational speed requirements for the pattern matching engine service 6 need not be as rigorous as for the statement receiver service 4. As a result of processing at the pattern matching engine service 6, one or more matched trigger rules 7 are identified and output for additional processing, and may also be stored in local storage (not shown) for subsequent processing.

The depicted xAPI connection process 2 also includes an outbound REST generator service 8 that is configured to perform one or more trigger actions in response to the matched trigger rule(s) 7 which may be received from the pattern matching engine service 6 or periodically retrieved from local storage (not shown). As disclosed herein, the trigger actions may be performed by issuing one or more outbound REST calls 3 which are issued to third party applications that automatically provide enhanced processing functionality. Examples of such automated processing functionality that could be triggered by an outbound REST 3 could include creating digital learning credentials (i.e., learning badges) or certificates in response to matching authorized xAPI statements with trigger rules that indicate that a student has completed required learning activities. Alternatively, an outbound REST 3 could trigger an automated email being sent to a student's supervisor or instructor recommending coaching if the authorized xAPI statements match with trigger rules to indicate that the student has failed an activity three times. Alternatively, an outbound REST 3 could trigger an automatic update to a human resources information system if the authorized xAPI statements match with trigger rules to indicate that an employee has met the requirements of a degree program. Another automated processing functionality that could be triggered by an outbound REST 3 could include granting access to secured facilities or enhanced security access in response to matching authorized xAPI statements with trigger rules that indicate that an employee has achieved specified results during security training courses. Alternatively, the outbound REST 3 could forward one of the received statements, or send an entirely new or modified statement that combines elements of the received rule-matching statements with other xAPI statement properties. As these examples illustrate, the outbound REST generator service 8 provides the ability to process matched trigger rules to call any outbound REST API 3 so that third party applications and software systems can be updated with the interrogated, consolidated, and/or curated xAPI data.

Figure 2:
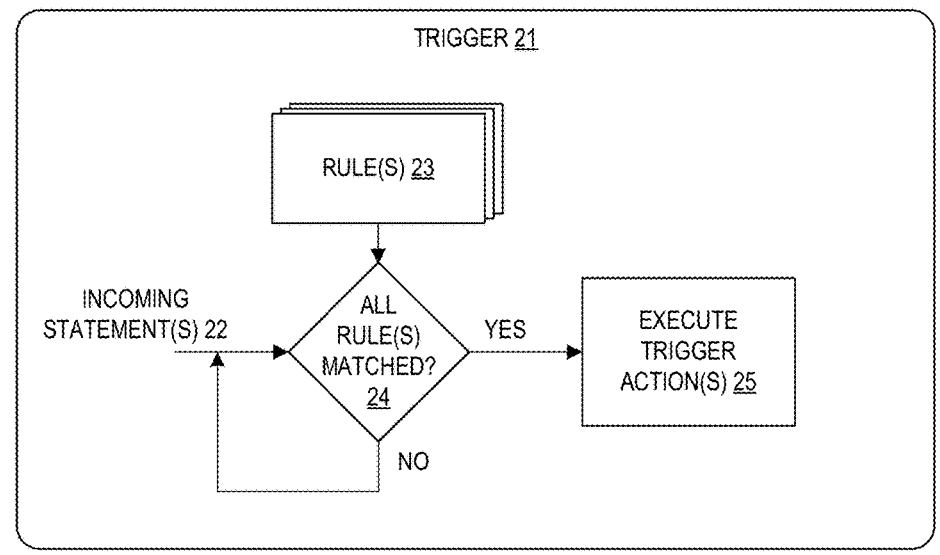
FIG. 2 is a schematic block diagram illustrating the functional operation of a trigger in accordance with selected embodiments of the present disclosure.

To provide additional details for an improved understanding of selected embodiments of the present disclosure, reference is now made to FIG. 2 which is a schematic block diagram 20 illustrating the overall functional operation of a trigger 21 which processes incoming statements 22 by matching them against multiple trigger rules 23 with a matching or comparison processing step 24 to execute trigger actions 25 upon determining that all of the required rules for a trigger are met by the incoming statements 22. As will be appreciated, the functional operation of the trigger 21 may be implemented in whole or in part with a data processing system and/or a single integrated circuit (e.g., a system-on-chip) or a plurality of integrated circuits to implement one or more processors with local memory and database storage that are interconnected and interoperate using any suitable techniques without departing from the present invention. However implemented, the operation of the trigger 21 includes receiving one or more input statements 22. In selected embodiments, the input statements 22 are received as xAPI statements that are generated from a plurality of different sources. In addition, the operation of the trigger 21 includes receiving or accessing one or more trigger rules 23 that are used to evaluate each input statement 22. In selected embodiments, one or more of the trigger rules 23 include matching property values and/or logical operator or comparison requirements that are compared to the incoming statements 22 to find matching rules. In addition, each trigger 21 may include multiple trigger rules 23 that must be matched with incoming statements 22 associated with a specific actor. In addition, the operation of the trigger 21 includes a comparison processing step 24 to determine if all of the requirements of the trigger rules 23 have been matched by the incoming statement(s) 22. If the required trigger rules are not matched by the incoming statement under review (negative outcome to detection step 24), then the next incoming statement is evaluated against the trigger rules. However, once all the rules for a given actor and trigger are matched by the incoming statements 22 (affirmative outcome to detection step 24), then corresponding trigger action(s) are executed at step 25 by generating the outbound REST API calls. Data about the actor can be embedded in the values passed to the outbound REST APIs.

As disclosed herein, xAPI statements are evaluated to find a match with one or more trigger rules before an associated trigger action is taken for an actor associated with the xAPI statements. To this end, each trigger rule may be defined using any suitable computer program code construct to specify a set of property values, alone or in combination with comparison and/or logical operator requirements, that are applied to the xAPI data from each xAPI statement. In selected embodiments, all of the property values, comparison operators, and logical operators (the "matching properties") are included in a single trigger rule that is compared to the xAPI statements. However, it may not be efficient to process such large and unwieldy trigger rules when large numbers of matching properties must be evaluated. To provide for faster processing of trigger rule matching and more efficient use of computational resources, a plurality of different trigger rules may be separately defined to advantageously specify different sets of matching properties, where the different trigger rules are sequentially applied to the xAPI data from each xAPI statement. In accordance with selected embodiments of the present disclosure, a first or parent trigger rule component may specify one or more flat properties of an xAPI statement that can be determined by reading and matching selected properties from the base level of a statement, while additional trigger rule components may specify one or more additional properties of an xAPI statement, such as context activity or extension information that is specified for the trigger rule. With this delineation of matching properties across multiple trigger rule components, the pattern match processing can more efficiently determine when an xAPI statement does not match the requirements for a trigger as soon as it is determined that one of the associated trigger rules components does not match the xAPI statement.

For each desired trigger, it will be appreciated that the allocation of matching properties amongst one or more trigger rules components can vary from one application to the next. However, to provide a non-limiting example of a set of associated trigger rule components over which a set of matching properties is allocated, reference is now made to FIGS. 3-5 which depict programming interface screenshots 30, 40, 50 for three example xAPI statement matching rule components which collectively define a plurality of matching properties required to match the entirety of the trigger rule.

Figures 3, 4, 5:
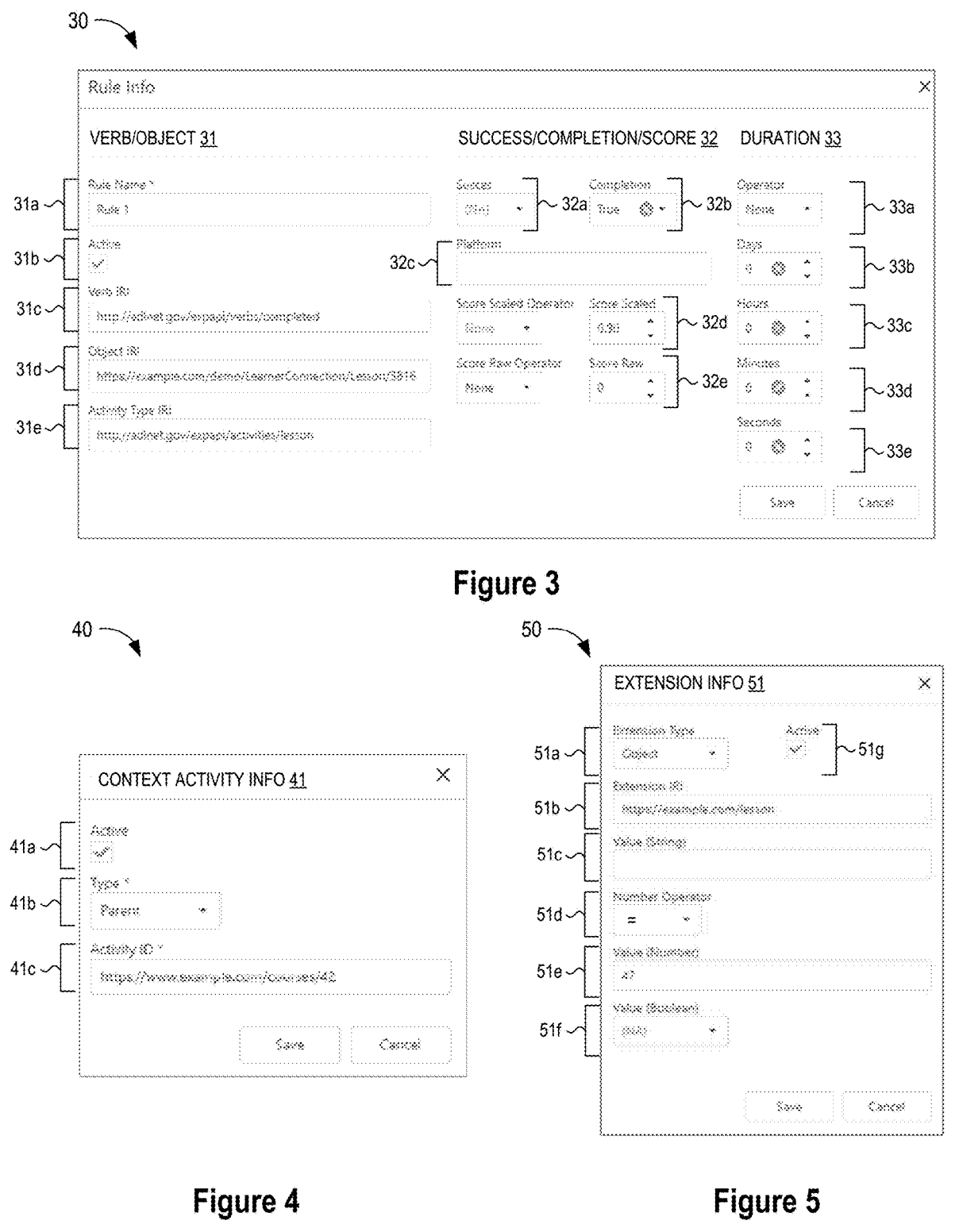

In the first programming interface screenshot 30 shown in FIG. 3, there is illustrated a first or parent trigger rule component which specifies a particular set of "verb object" property values 31, a set of success/completion/score (or "result") properties 32, and a set of "duration" properties 33 that must be matched by an xAPI statement for the first or parent trigger rule component to be matched. As will be appreciated, any suitable computer program code can be used to construct the first programming interface screenshot 30, and the illustrated fields described hereinbelow are presented to illustrate an example implementation of the present disclosure. As depicted, the first or parent trigger rule component includes a required "Rule Name" field/property 31a (which is a unique name to identify the rule) and a required "Active" field/property 31b (which is checked to indicate if the rule is active or is not checked if the rule is inactive). Inactive rules are not processed by the pattern matching engine. The depicted set of "verb object" property values 31 may include a "Verb IRI" field/property 31c (which is a unique international resource identifier (IRI) for the statement verb), an "Object IRI" field/property 31d (which is a unique IRI for the statement object), and an "Activity Type IRI" field/property 31e (which is a unique IRI for the statement object's activity type). When configuring the first or parent trigger rule component, any of the Verb, Object, Activity Type, Score, Success, Completion, Platform or Duration fields/properties 31c-e can be left blank to cause the first or parent trigger rule component to ignore the corresponding field/property(s). In the depicted example, the "verb object" property values 31 for the trigger rule (Rule 1) indicate that a specified course lesson was completed.

The depicted first or parent trigger rule component also includes the set of optional "result" properties 32 for the success/completion/score of the course lesson. For example, the "result" properties 32 may include a "Success" field/property 32a which is a true/false value for the success property of a statement, and which can be set to "All" to ignore the success property. In addition, a "Completion" field/property 32b which specifies a true/false value for the completion property of a statement, and which can be set to "All" to ignore the completion property. The "result" properties 32 may also include a "Platform" field/property 32c which provides a text value which identifies a platform property of the statement (e.g., the training tool used to provide the course lesson), and which can be left blank to ignore the platform property. In addition, the "result" properties 32 may include one or more xAPI score properties. For example, a "Score Scaled" field/property 32d may include one or more comparison operators (e.g., less than, less or equal to, equal, greater than or equal to, greater than) and a value to specify that the score scaled must be greater than or equal to a specified value (e.g., 0.90 or 90%). In addition or in the alternative, a "Score Raw" field/property 32e may include one or more comparison operators and a value to specify that the score raw value must be greater than or equal to a specified value.

In addition or in the alternative, the depicted first or parent trigger rule component may include the set of optional "duration" properties 33 for the course lesson. For example, an "Operator" field/property 33a may include one or more comparison operators which operate on a duration property of an xAPI statement, while the Days, Hours, Minutes, and Seconds field/properties 33b-e specify the comparative time value. For example, the "duration" properties 33 can specify that the duration of the actor's engagement with the activity (e.g., lesson) must be greater than or equal to 30 minutes. Alternatively, the optional "duration" properties 33 can be ignored if none of the "duration" property values 32a-e are specified.

In operation, the property values may be entered by the administrator into the property/fields 31-33 of the first programming interface screenshot 30 and then saved to specify the first or parent trigger rule component. Subsequently, the first or parent trigger rule component is compared to properties (excluding 31a and 31b) from an xAPI statement to determine if there is a property match. If there is a property match, then the first or parent trigger rule component is identified as a match for the first or parent trigger rule component. However, if there is a mismatch between the properties from an xAPI statement and any of the matching properties 31-33 of the first or parent trigger rule component (excluding 31a and 31b), then the trigger rule is not a matching trigger rule.

Turning now to FIG. 4, there is shown a second programming interface screenshot 40 for a trigger rule which specifies or defines rule context activities information 41 with one or more context activity property or fields that must be matched by an xAPI statement for the context activity trigger rule component to be matched. Again, any suitable computer program code can be used to construct the second programming interface screenshot 40, and the illustrated context activity properties or fields described hereinbelow are presented to illustrate an example implementation of a context activity trigger rule component in accordance with selected embodiments of the present disclosure. As depicted, the context activity trigger rule component includes a required "Active" field/property 41a (which is checked to indicate if the context activity is active or is not checked if the context activity is inactive). Inactive context activities are not processed by the pattern matching engine. In addition, the context activity trigger rule component includes a "Type" property value or field 41b which may be an array value that specifies the type of context activity which may be selected from a group (e.g., Parent, Group, Category and Other) and an "Activity ID" property value or field 41c which specifies or identifies the context activity for the context activity trigger rule component. In the depicted example, the context activity information property values 41 for the context activity trigger rule component indicate that the specified lesson (from the first or parent trigger rule component) belongs to a particular course (e.g., course no. 42). In operation, once the property values are entered and saved in the property/fields 41a-c of the second programming interface screenshot 40, the context activity trigger rule component may be compared (excluding 41a) to properties from an xAPI statement to determine if there is a property match (in which case the context activity trigger rule component is identified as a matching trigger rule component) or if there is not a match (in which case the context activity trigger rule component is not a match for the trigger rule).

Turning now to FIG. 5, there is shown a third programming interface screenshot 50 for a trigger rule which specifies or defines rule extensions information 51 with one or more extension properties or fields that must be matched by an xAPI statement for the extension trigger rule component to be matched. While any suitable computer program code can be used to construct the third programming interface screenshot 50, the illustrated rule extension property/field(s) described hereinbelow are presented to illustrate an example implementation of an extension trigger rule in accordance with selected embodiments of the present disclosure. As depicted, the extension trigger rule component includes an "Extension Type" property value or field 51a which may be an array value that indicates whether the rule extension is for an xAPI object or xAPI result (as specified in the first or parent trigger rule component) or an xAPI context (as specified in the context activity trigger rule component). The depicted extension trigger rule component also includes an "Extension IRI" property value or field 51b which specifies or identifies the IRI value for the rule extension that is compared to the xAPI statement. In addition, the depicted extension trigger rule component may include a "Value" field/property 51c-f which specify a value string, number and/or Boolean operator for the rule extension. For example, the "Value (String)" property/field 51c may specify a string value that must be matched by the xAPI statement to satisfy the extension trigger rule component. In the alternative, the "Number Operator" field 51d may specify a comparative number operator (less than, less or equal to, equal, greater than or equal to, greater than) that is paired with a numeric value in the "Value (Number)" a" property/field 51e when evaluating the xAPI statement to satisfy the extension trigger rule component. In the alternative, the "Value (Boolean)" property/field 51f may specify a comparative logic or Boolean operator which specifies a true/false value for a Boolean extension property of the extension trigger rule component, and which can be set to "All" to ignore the Boolean extension property. In addition, the extension trigger rule component includes a required "Active" field/property 51g (which is checked to indicate if the extension is active or is not checked if the extension is inactive). Inactive rules are not processed by the pattern matching engine. In the depicted example, the extension information property values 51 for the extension trigger rule component indicate that the specified lesson (from the first or parent trigger rule component) has a course number value that indicates a particular lesson (e.g., lesson no. 47) was met. In operation, once the property values are entered and saved in the property/fields 51a-g of the third programming interface screenshot 50, the extension trigger rule component may be compared (excluding 51g) to properties from an xAPI statement to determine if there is a property match (in which case the extension trigger rule component is identified as a match for the trigger rule) or if there is not a match (in which case the extension trigger rule component is not a matching trigger rule).

With the depicted allocation of matching properties amongst the trigger rule components illustrated in FIGS. 3-5, it can be seen that the first or parent trigger rule component specifies matching selected properties for defined flat properties of an xAPI statement that can be determined by reading and matching selected properties from the base level of an xAPI statement. As such, the first or parent trigger rule component can quickly determine if the xAPI statement in question is not a matching rule, thereby conserving computational resources from being used to evaluate the context activity and extension trigger rule components and also expediting the process for evaluating the xAPI statement in question against the requirements of a trigger rule.

As disclosed herein, one or more trigger actions are taken for an actor associated with a set of one or more xAPI statements upon determining that they have xAPI properties that match the requirements of one or more trigger rules that are associated with the trigger action(s). In selected embodiments, each trigger action may be implemented by issuing a representational state transfer (REST) API message to communicate with third-party applications. As will be appreciated by those skilled in the art, REST API messaging is a software architectural style that defines a uniform interface between decoupled components in the Internet in a Client-Server architecture. Generally speaking, REST defines four interface constraints: identification of resources, manipulation of resources, self-descriptive messages, and hypermedia as the engine of application state.

To construct the specific trigger action(s), any suitable computer program code can be used which can construct and issue outbound REST API messages. One technique for configuration technique may be employed by an administrator or programmer who uses one or more trigger action programming interface screens to enter property values into trigger action fields, and then saved to specify the trigger action. To provide a non-limiting example of a set of trigger action programming interface screens which are used to configure a trigger action, reference is now made to FIGS. 6-10 which depict a plurality of programming interface screenshots which define a trigger action.

Figures 6, 7:
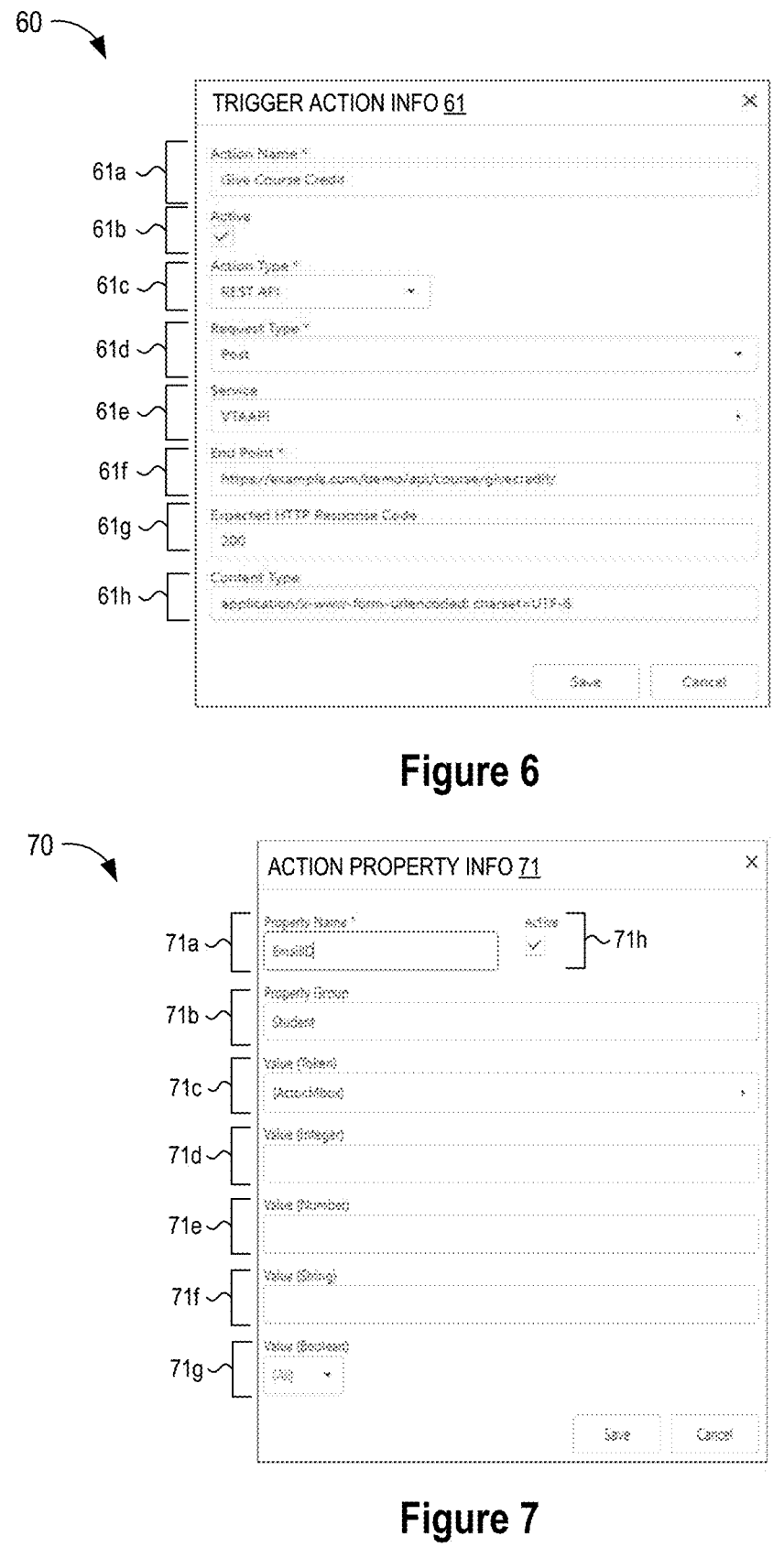

Turning first to FIG. 6, there is depicted a programming interface screenshot 60 for an example set of trigger action properties 61 which begin the definition of an outbound REST API trigger action that is issued if all the associated trigger rule requirements have been met by one or more xAPI statements in accordance with selected embodiments of the present disclosure. As depicted in the programming interface screenshot 60, the depicted trigger action information 61 includes a required "Action Name" field/property 61a (which is a unique name to identify the trigger action) and a required "Active" field/property 61b (which is checked to indicate if the trigger action is active or is not checked if the trigger action is inactive). Inactive trigger actions are not issued. The depicted trigger action information 61 also includes a required "Action Type" field/property 61c. The "Action Type" may be REST API, Statement Forwarding or Statement Transformation. The depicted trigger action information 61 also includes a required "Request Type" field/property 61d which identifies the HTTP Request Method which may be selected from a group (e.g., GET, POST, PUT, DELETE or PATCH). In addition, the depicted trigger action information 61 may optionally include a "Service" field/property 61e which specifies a "service" that is a defined collection of trigger action properties that can be re-used by multiple trigger actions. An example of a "VTAAPI" service might be assembling credentials and a basic endpoint location for use in making REST API calls. In addition, the depicted trigger action information 61 includes a required "End Point" field/property 61f (which is the REST API endpoint that will be called to invoke the trigger action). The depicted trigger action information 61 also includes a required "Expected Response Code" field/property 61g to indicate if a REST API call is successful. Finally, the depicted trigger action information 61 may include a "Content Type" field/property 61h (which specifies required content type needed by the HTTP request). In the depicted example, the activated trigger action ("Give Course Credit") defines an outbound REST API trigger action as a payload post to the specified end point ("https://example.com/api/course/givecredit") which includes the "content type" that is added to the top of the post in HTTP so that the server side can process the post. To expedite configuration of the "End Point" field/property 61e, the "VTAAPI" value entered in the "Service" field/property 61d causes the first portion of the "End Point" field/property 61e to be automatically populated with the "https://example.com/VTAAPI/api" string, thereby expediting identification of the REST API endpoint.

Turning now to FIG. 7, there is depicted a programming interface screenshot 70 for an example set of trigger action property properties 71 which define additional trigger action properties of an outbound REST API which is issued if all the associated trigger rule requirements have been met by one or more xAPI statements in accordance with selected embodiments of the present disclosure. As depicted in the programming interface screenshot 70, the depicted trigger action property 71 includes a required "Property Name" field/property 71a (which is the name of the trigger action property) and "Active" field/property 71h (which is checked to indicate if the trigger action property is active or is not checked if the trigger action property is inactive). The depicted trigger action property 71 may also include a "Property Group" field/property 71b which may specify that the property is part of an object (property group). In the example, the "EmailID" trigger action property is part of the "Student" property group. The depicted trigger action property 71 may also include a "Value (Token)" field/property 71c which generates the outbound REST API call by substituting data from the xAPI statement(s) for the indicated token. In addition, the depicted trigger action information 71 may include one or more "Property Value" field/properties 71d-g which may specify a data type of integer 71d, number 71e, string 71f, or Boolean 71g. Only one data type may be used for each property. In the depicted example, the activated trigger property ("EmailID") defines a trigger action property for the outbound REST API trigger action in the payload post to include the student's email address specified by the token value 71c which substitutes data from the xAPI statement(s) for the indicated token {Actor.Mbox}.

Figure 8:
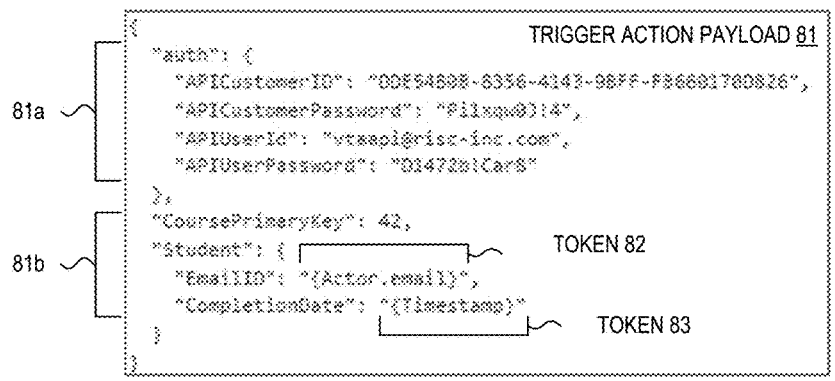
FIG. 8 illustrates an example payload for an outbound REST API trigger action in accordance with selected embodiments of the present disclosure.

As disclosed herein, each outbound REST API trigger action may be generated to include a trigger action data payload as part of a JavaScript Object Notation (JSON) statement format that is used to pass the data payload to a REST API. Turning now to FIG. 8, there is illustrated an example data payload 81 for an outbound REST API trigger action. As depicted, the trigger action payload 81 includes a first payload portion 81a which is populated by a service (e.g., VTAAPI) specified in the "Service" field/property (e.g., 61d of the trigger action information 61). In this example, the first payload portion 81a includes one or more API properties (e.g., API customer identification, API customer password, API user identification, and API user password) that are provided by the specified service. In addition, the trigger action payload 81 includes a second payload portion 81b for an outbound REST API trigger action, where the second payload portion 81b is populated by the trigger action property information (e.g., 71). In this example, the second payload portion 81a includes one or more trigger action properties (e.g., CoursePrimaryKey, Student, EmailID, and CompletionDate) that are unique to this particular trigger action and that are provided by the matching properties in the xAPI statements. In the depicted example, the trigger action properties may identify the course being credited (course 42), the actor or student being credited (identified by the {Actor.email} token 82 which substitutes the email address for the actor associated with the matching xAPI statements), and the time when the credit was awarded (identified by the {Timestamp} token 93 which substitutes the timestamp value from the last xAPI statement having matching xAPI data).

As disclosed herein, a "service" is a collection of trigger action properties that can be re-used by multiple trigger actions. For example, if several API's use the same security properties, a service could be created to facilitate the configuration of trigger actions by automatically including the common security properties into the trigger action data payload that is sent to the outbound REST API. For an improved understanding of how to define a "service" as part of the trigger action configuration process, reference is now made to FIG. 9 which illustrates a programming interface screenshot 90 with defined service values 91 for configuring an example outbound REST API call in accordance with selected embodiments of the present disclosure. As depicted in the programming interface screenshot 90, the service values 91 include a required "Service Name" field/property 91a which is a unique name of the service (e.g., VTAAPI). The depicted services values 91 may also include a "Default Endpoint" field/property 91b which may specify a default endpoint that is copied into a trigger action data payload. This feature is useful when using multiple trigger actions for a single third-party application, since they are likely to have similar endpoints, but the default value can be changed at any time when configuring the trigger action. In the example of the VTAAPI service, the depicted service values 91 may also include an "Authorization Header" field/property 91c to specify the security credentials required for the trigger action REST API. However, it will be appreciated that the use of Authorization Header will depend on the API being called. In the depicted example, the VTAAPI service does not use an Authorization Header as the security properties are included in the request payload.

Figures 9, 10:
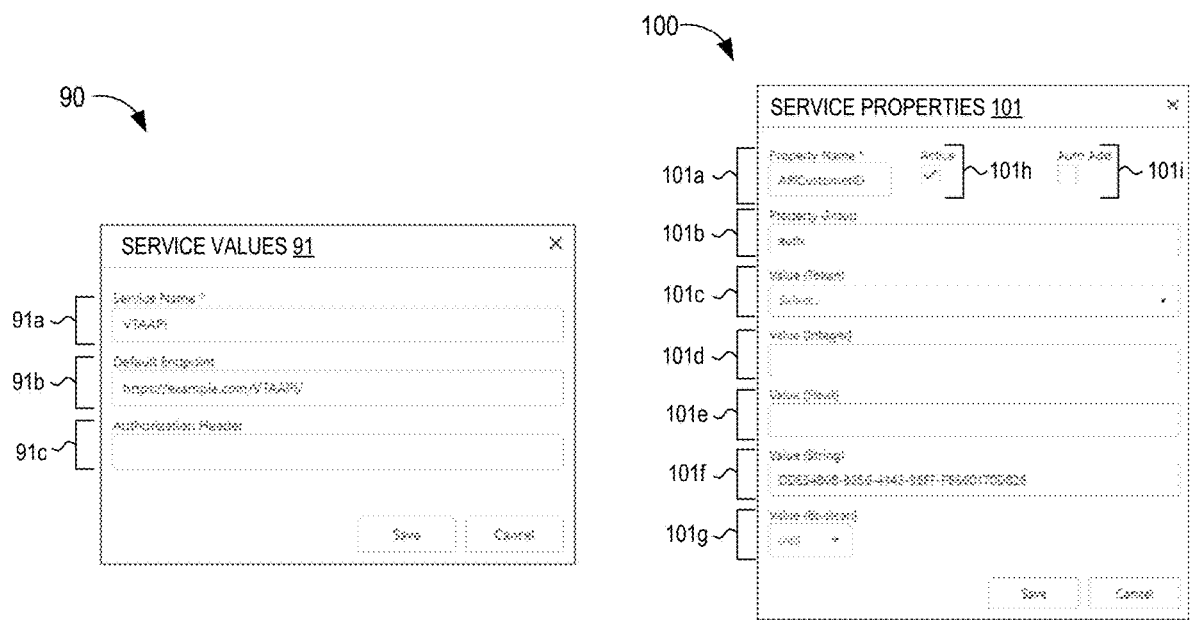
FIG. 9 illustrates a programming interface screenshot with defined service values for configuring an outbound REST API call in accordance with selected embodiments of the present disclosure.
FIG. 10 illustrates a programming interface screenshot with defined service properties for configuring an outbound REST API call in accordance with selected embodiments of the present disclosure.

Turning now to FIG. 10, there is depicted a programming interface screenshot 100 having an example set of service property information properties 101 for configuring an example outbound REST API call in accordance with selected embodiments of the present disclosure. As depicted in the programming interface screenshot 100, the service property information 101 includes a required "Property Name" field/property 101a (which is the name of the service property) and "Active" field/property 101h (which is checked to indicate if the service property is active or is not checked if the service property is inactive). The depicted service property information 101 may also include an "Auto Add" field/property 101i which, when selected or checked, automatically copies the service properties to the trigger action properties (e.g., FIG. 7) when a source is selected for a new trigger action. In addition, the service property information 101 may also include a "Property Group" field/property 101b which may specify that the service property is part of an object (property group). In the example, the "APICustomerID" service property is part of the "auth" property group. The depicted service property information 101 may also include a "Value (Token)" field/property 101c which generates the outbound REST API call by substituting data from the xAPI statement(s) for the indicated token. In addition, the depicted service property information 101 may include one or more "Property Value" field/properties 101d-g which may specify a data type of integer 101d, number 101e, string 101f, or Boolean 101g. Only one data type may be used for each service property. In the depicted example, the activated service property ("APICustomerID") defines a service property for configuring the data payload of the outbound REST API trigger action to include the value string (DDE54B0B-8356-4143-9BFF-FB660170D826) as the API customer identifier.

Figure 11:
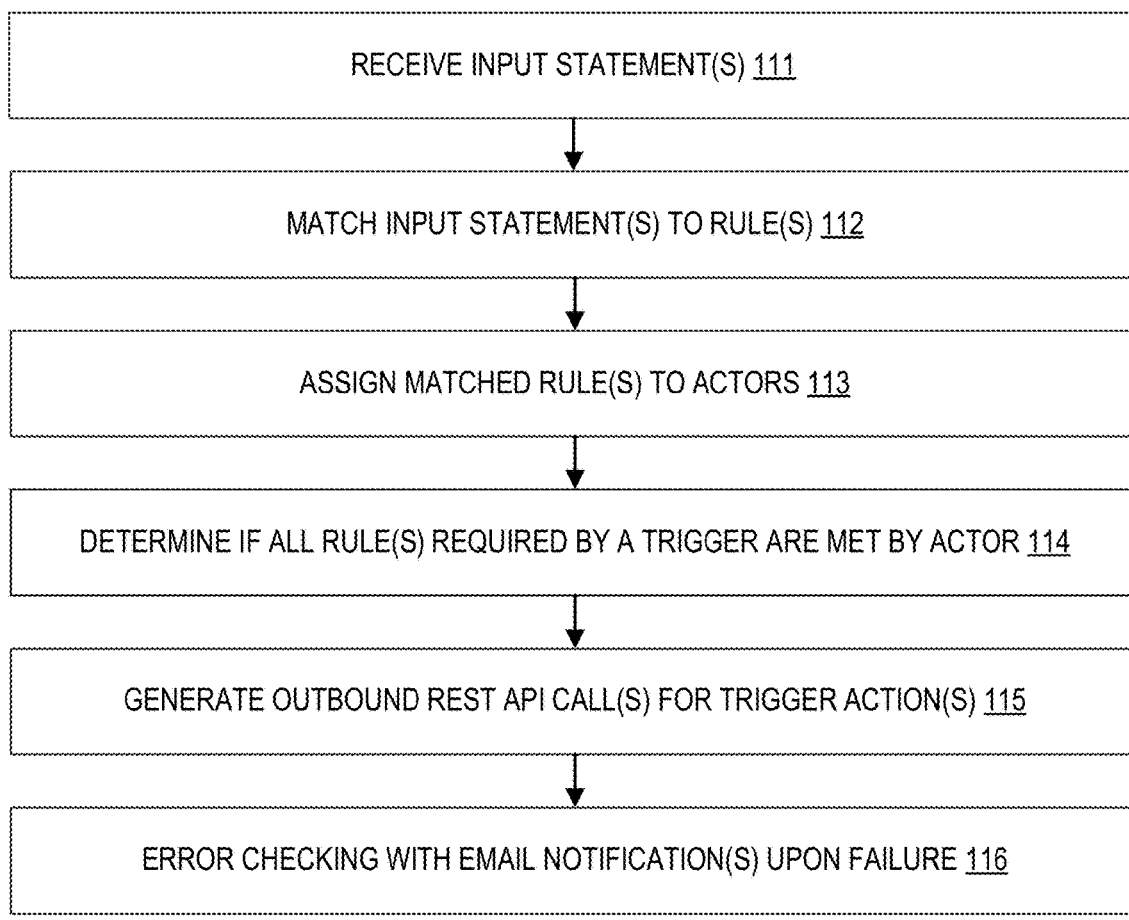
FIG. 11 is a simplified flow chart showing a sequence of steps performed to securely receive and assess xAPI statements against trigger rules to update third party applications using output representational state transfer (REST) APIs in accordance with selected embodiments of the present disclosure.

To provide additional details for an improved understanding of selected embodiments of the present disclosure, reference is now made to FIG. 11 which illustrates a high-level workflow chart 110 showing the logic and sequence of steps for securely receiving and assessing xAPI statements against trigger rules to update third party applications using output representational state transfer (REST) APIs. As will be appreciated, the depicted sequence of steps 111-116 may be implemented in whole or in part with a data processing system and/or a single integrated circuits (e.g., a system-on-chip) or a plurality of integrated circuits to implement one or more processors with local memory and database storage that are interconnected and interoperate using any suitable techniques without departing from the present invention. However implemented, the workflow 110 receives one or more input statements (step 111). In selected embodiments, the input statements are xAPI statements that are generated over time by a plurality of input sources and/or xAPI statement providers, such as LRS or LRP sources. Upon receiving the input statements, they may be authorized or approved, such as by processing credentials or other authentication information received from each input source.

At step 112, the input statements are compared to one or more trigger rules to find input statements that match the requirements of the trigger rule(s). In selected embodiments, the match processing at step 112 may use a pattern matching process to compare xAPI data from each input xAPI statement to matching properties specified in one or more trigger rules. As will be appreciated, the pattern matching process may employ any suitable program code for matching properties from input statements with the trigger rule(s). In addition to comparing xAPI data with matching data properties specified in the trigger rule(s), the pattern matching process may process received input xAPI statements by combining logical and/or comparative operators with xAPI data points. In selected embodiments, the trigger rules may be constructed and sequenced to include a first or parent trigger rule component (which specifies one or more flat properties of an xAPI statement) and one or more additional trigger rule aspects or components which specify one or more additional properties of an xAPI statement to be matched, such as context activity or extension information that is specified for the trigger rule. In selected embodiments, the first or parent trigger rule component may specify only "verb" and "object" matching properties (but not an "actor" property) for comparison to the xAPI data in order to more efficiently perform the pattern matching processing. In other embodiments, the trigger rule can include only flat properties, or can include a combination of flat properties with context activities and/or extensions. In other embodiments, the flat properties may be specified in the first or parent trigger rule component, and the context activities and/or extensions can be separately specified as additional trigger rule aspects or components. In yet other embodiments, the flat properties, context activities and extensions can be specified in separate trigger rules. Upon determining that all of the matching properties specified in a plurality of trigger rule components are matched or met by the xAPI data from the input xAPI statement(s), the plurality of trigger rules may be identified as matching trigger rules for an actor.

At step 113, the matching trigger rules are assigned or associated with the actors corresponding to the received input statements. In selected embodiments, the processing at step 113 may be performed with a rule assignment to actor process which runs separately from the pattern matching process to generate and store records of matching trigger rules and the associated actor. As will be appreciated, the rule assignment process may employ any suitable program code for identifying the actor that is associated with the xAPI statements that match the trigger rule(s), and then storing in a database an actor/trigger record which identifies the actor and matching trigger rules for each trigger action.

At step 114, the process determines if all of the matching trigger rules required for a specified trigger have been met by an actor. In selected embodiments, the processing at step 114 may be performed with an outbound REST API generator process which runs separately from the pattern matching and rule assignment processes, and may employ any suitable program code for determining if all the rules required for a particular trigger are met by a single actor. In selected embodiments, the determination may be made by retrieving the actor/trigger records from a database to identify the active matching trigger rule(s) and then comparing the active matching trigger rule(s) to all active trigger rules for each trigger to determine if there is a match between the active matching trigger rule(s) and the active trigger rules for each trigger.

At step 115, one or more outbound REST APIs are generated and processed in response to determining that the trigger rules required for a trigger have been met by the input statements associated with an actor. In selected embodiments, the processing at step 115 is implemented with a REST API process that may be performed separately from the pattern matching and rule assignment processes. In addition, the generated outbound REST API calls may include a data payload that includes not only data received in xAPI statements, but also other properties and information. As will be appreciated, the outbound REST API process may employ any suitable program code for automatically generating REST API calls with defined trigger action payloads to end points specified for the trigger action in question when there is a match between the active matching trigger rule(s) and the active trigger rules for each trigger. In such embodiments, the "actor" is not required to manually click on links to other systems.

At step 116, an error checking process is applied to detect any failures in the outbound REST API calls. Email notifications can be issued to the owner of the trigger action if there is any failure of execution. In selected embodiments, the error check processing at step 116 is implemented with a REST API process that records an error in a log if the outbound REST API call fails. Examples of such errors include receiving a HTTP 400 bad request response status code indicating that the server cannot or will not process the request due to something that is perceived to be a client error (for example, malformed request syntax, invalid request message framing, or deceptive request routing) or an HTTP 403 forbidden response status code indicating that the server understands the request but refuses to authorize it.

Figure 12:
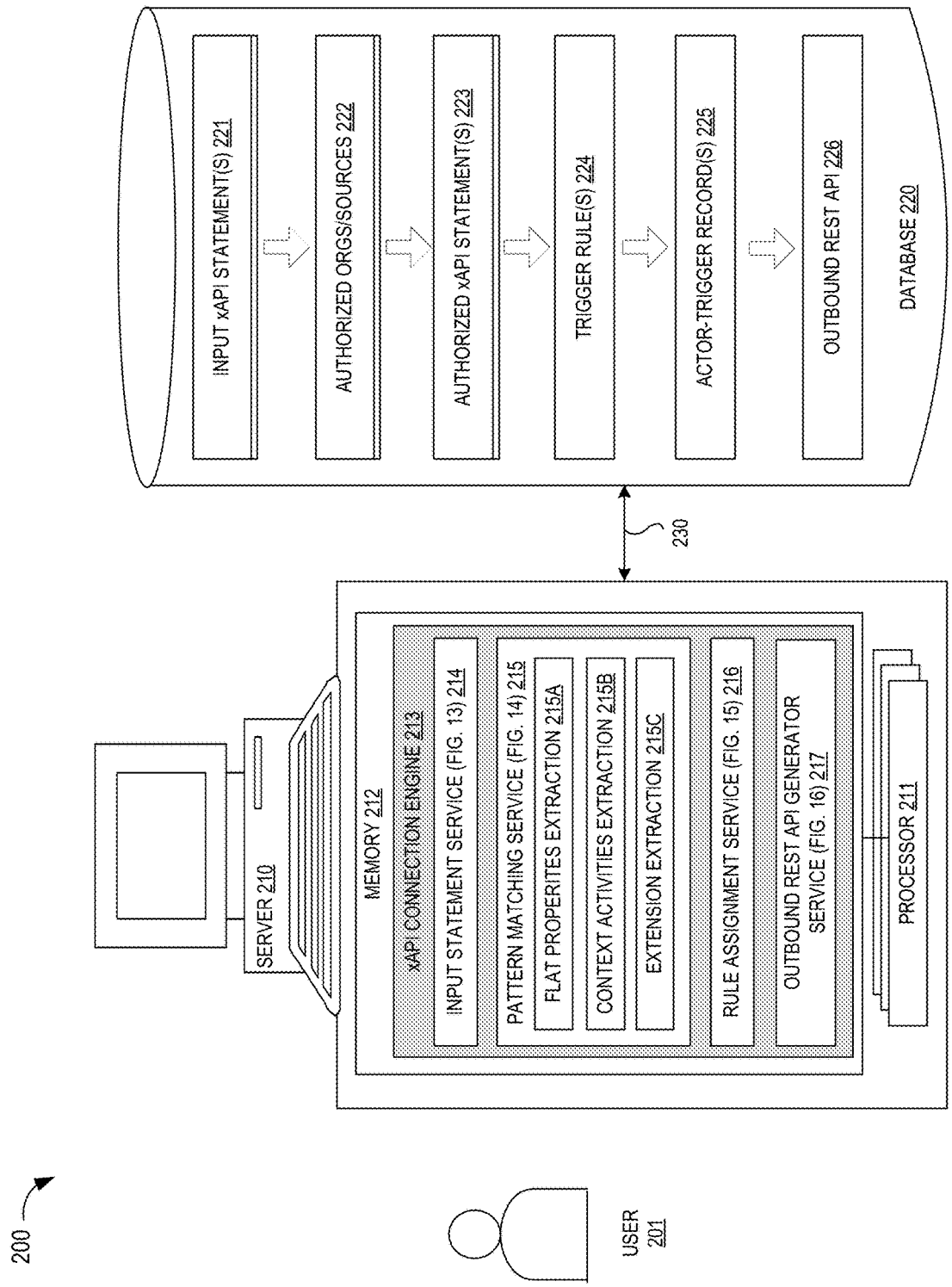
FIG. 12 is a simplified block diagram of a data processing system for connecting xAPI Statements with third party applications using REST APIs in accordance with selected embodiments of the present disclosure.

Referring now to FIG. 12, a simplified block diagram illustrates an exemplary data processing system 200 for automatically connecting xAPI statements with third party applications using REST APIs. In the depicted system 200, one or more server/computer systems 210 are connected to an associated database storage device 220 over a suitable connection link 230 or network, such as a private wide area network (WAN) or the Internet (not shown), to evaluate input xAPI statements 221 that are received and stored in the database 220. In some illustrative embodiments, the server/computer system 210 may be embodied as an information handling system to use natural language processing and database processing techniques which are augmented with the mechanisms of the illustrative embodiments described hereafter. In an information handling system implementation, an xAPI connection engine 213 may be embodied as a computer program stored in memory 212 which uses one or more processors 211 to query a structured or unstructured knowledge or information in the knowledge database 220 which includes one or more input xAPI statements 221 that have been generated by a plurality of different LRS or LRP sources, a listing of one or more authorized organizations or sources 222, one or more authorized xAPI statements 223, one or more trigger rules 224, actor-trigger records 225, and one or more outbound REST API call statements 226.

To process the knowledge or information 221-226 in the knowledge database 220, the xAPI connection engine 213 may include an input statement processing service 214 that is configured to process, authorize and/or approve received input xAPI statements 221 with reference to the listing of one or more authorized organizations or sources 222, thereby generating the authorized input statements 223 which may be stored the knowledge database 220. In operation, the input statement processing service 214 may retrieve input xAPI statements 221 from database storage 220 in batches and then evaluate the credentials or other authentication information received with the input xAPI statements against authentication information associated with the listing of one or more authorized organizations or sources 222. Additional details for an example embodiment of the input statement processing service 214 are described with reference to FIG. 13 as set forth hereinbelow.

In addition, the xAPI connection engine 213 may include a pattern matching service 215 that is configured to automatically compare each authorized xAPI statement 223 to matching properties specified in one or more trigger rules 224. In selected embodiments, the pattern matching service 215 may use NLP processing techniques to assess xAPI data from each authorized xAPI statement 223 against one or more trigger rules 224 for purposes of identifying authorized xAPI statements 223 that match the requirements of the trigger rules 224. In addition to comparing xAPI data with matching data properties specified in the trigger rule(s) 224, the pattern matching service 215 may process received input xAPI statements by combining logical and/or comparative operators with xAPI data points.

In selected embodiments, the trigger rules 224 are constructed and sequenced so that each trigger rule may include a first or parent trigger rule component (which specifies one or more flat properties of an xAPI statement) and one or more additional trigger rule components which specify one or more additional properties of an xAPI statement to be matched, such as context activity or extension information that is specified for the trigger rule. In such embodiments, the pattern matching service 215 may include a flat properties extraction service 215A that is configured to automatically process the first or parent trigger rule component to evaluate the one or more flat properties of an authorized xAPI statement against matching properties specified in the first or parent trigger rule component. In addition or the alternative, the pattern matching service 215 may include a context activities extraction service 215B that is configured to automatically process a second, additional trigger rule component to evaluate context activities information from an authorized xAPI statement against matching properties specified in the second, additional trigger rule component. In addition or the alternative, the pattern matching service 215 may include an extension extraction service 215C that is configured to automatically process a third, additional trigger rule component to evaluate extension information from an authorized xAPI statement against matching properties specified in the third, additional trigger rule component. In selected embodiments, the pattern matching service 215 may be configured to process trigger rules 224 which specify only "verb" and "object" matching properties (but not an "actor" property) for comparison to the xAPI data in order to more efficiently perform the pattern matching processing. In this way, computational resources are not deployed to perform comparative matching of all authorized xAPI statements 223 against large listing of actors processed by the data processing system 200. Additional details for an example embodiment of the pattern matching service 215 are described with reference to FIG. 14 as set forth hereinbelow.

To process trigger actions on a per-actor, per-trigger basis, the xAPI connection engine 213 may include a rule assignment service 216 that is configured to assign or associate the matching trigger rules 224 with the actors corresponding to the authorized xAPI statements 223. In selected embodiments, the rule assignment service 216 may be configured to use NLP processing techniques to retrieve the trigger rules 224 and matching authorized xAPI statements 223 from the knowledge database 220, and to create an actor-trigger record 225 that is stored in the knowledge database 220 which associates the matching trigger rules with the actor that is associated with the matching xAPI statements. Additional details for an example embodiment of the rule assignment service 216 are described with reference to FIG. 15 as set forth hereinbelow.

To generate outbound REST APIs for each trigger action having its trigger rules matched by one or more authorized xAPI statements 223, the xAPI connection engine 213 may include an outbound REST API generator service 217 that is configured to generate the outbound REST API call with a defined trigger action data payload. In selected embodiments, the outbound REST API call 226 may be stored in the knowledge database 220 and/or automatically transmitted to the third-party application identified by the trigger action end point without requiring additional input from the "actor." Additional details for an example embodiment of the outbound REST API generator service 217 are described with reference to FIG. 16 as set forth hereinbelow.

As disclosed herein, the configuration and running of the xAPI connection engine services 213 may include providing application specific hardware, firmware, and/or software to implement one or more control logic modules 214-217 to facilitate the performance of the operations and generation of the outputs described herein with regard to the illustrative embodiments. In addition or in the alternative, the configuration and running of the services 214-217 in the xAPI connection engine service 213 may include storing software applications in one or more storage devices and loaded into memory of a computing device, such as server 210, for causing one or more hardware processors (e.g., 211) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments. Once the server/computer system 210 is configured to implement the xAPI connection engine service 213, the server/computer system 210 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates efficient processing of xAPI statements from multiple different LRS and LRP sources to execute a specified trigger action connection to a third-party application when a plurality of trigger rules associated with the specified trigger are matched by one or more authorized xAPI statements.

As will be appreciated, the modules and systems of the depicted xAPI connection engine service 213 and supporting services 214-217 represent a set of executable software instructions which are executed in hardware (e.g., memory and processor) on one or more web servers. However, to avoid obscuring the description with unnecessary detail, various functional modules and systems that are not germane to conveying an understanding of the present disclosure have been omitted. As such, persons skilled in the art will recognize that additional functional modules and systems may be used with the xAPI connection engine service 213 to facilitate additional functionality that is not specifically described herein. Furthermore, the various functional modules and systems depicted in FIG. 12 may reside on a single web server computer, or may be distributed across several server computers in various arrangements. Moreover, although the xAPI connection engine service 213 is depicted as a single software system block, the xAPI connection system is not limited to such an architecture. It is contemplated that other types of architecture are within the scope of the present disclosure.

Figure 13:
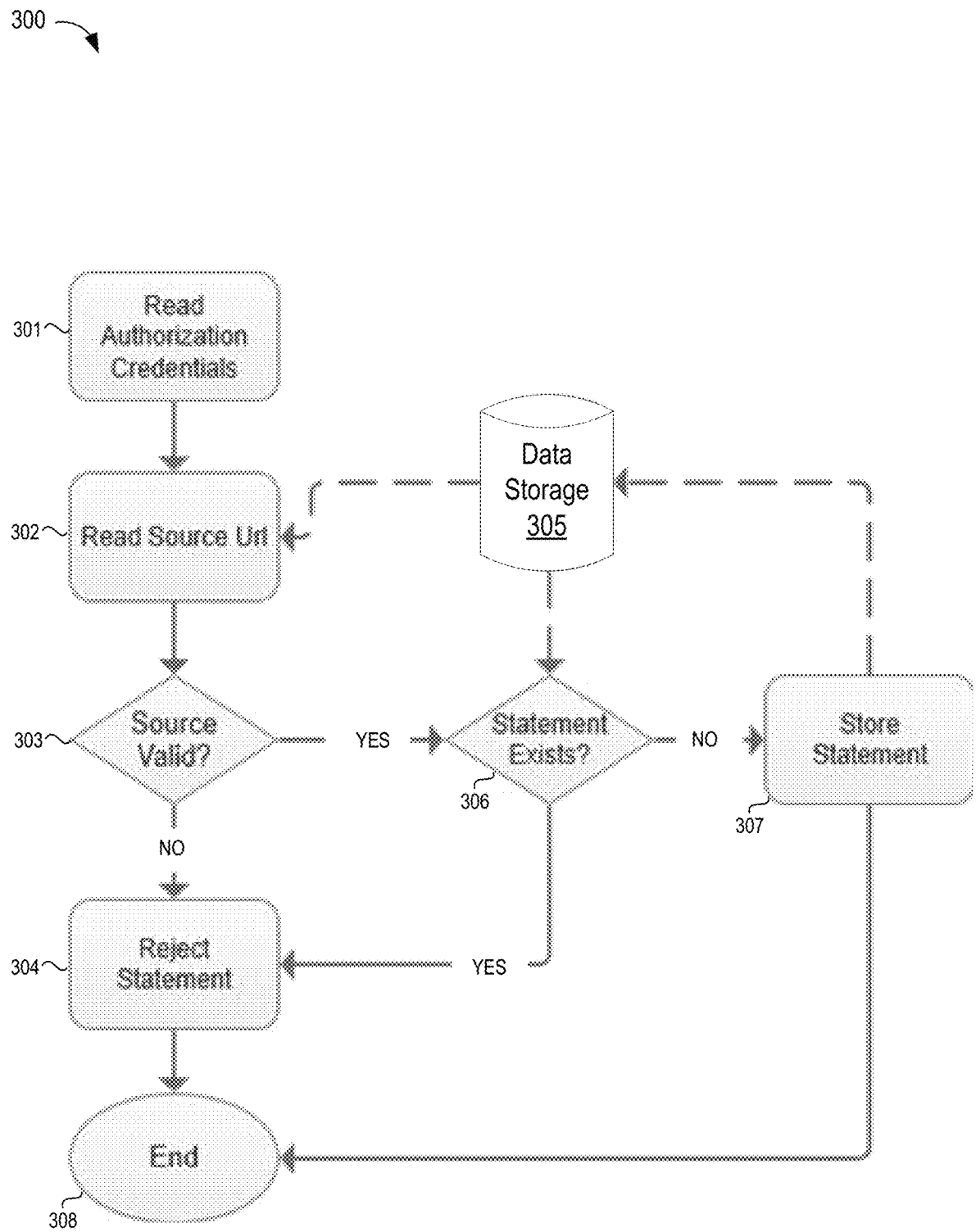
FIG. 13 is a simplified flow chart showing a sequence of steps for receiving and assessing xAPI statements against trigger rules in accordance with selected embodiments of the present disclosure.

To provide additional details for an improved understanding of selected embodiments of the present disclosure, reference is now made to FIG. 13 which illustrates a simplified flow chart showing 300 showing the logic and processing sequence of steps for receiving and assessing xAPI statements against authorization details which may be implemented in the xAPI connection engine by an always-on statement receiver. As will be appreciated, the depicted processing flow 300 may be implemented in whole or in part with a data processing system (such as shown in FIG. 12), a single integrated circuit (e.g., a system-on-chip), or a plurality of integrated circuits to implement one or more processors with local memory and database storage that are interconnected and interoperate using any suitable techniques without departing from the present invention. However implemented, the processing flow sequence 300 starts at step 301 upon receiving a single xAPI input statement or a group of statements in a single post. For each xAPI statement, the statement receiver reads the authorization credentials of the source that sent the statement (step 301), such as by reading the HTTP Authorization header of the xAPI statement. At step 302, the statement receiver retrieves a listing of authorized source URLs from the data storage 305 (as indicated by the dashed access line), and determines the source of the statement from the Origin HTTP header. At step 303, the statement receiver determines if the statement source is valid, such as by validating the ID, password, and Source URL against the listing of authorized source URLs from the data storage 305. The validation check step 303 may check that both the Organization and the Source for the xAPI statement are currently active. For received xAPI statements that are not from valid sources (negative outcome to detection step 303), the xAPI statement is ignored or rejected (step 304) and the statement processing ends (step 308). However, upon detecting that an xAPI statement is received from a valid source (affirmative outcome to detection step 303), the statement receiver checks to see if the xAPI statement is a duplicate of a previously received statement at step 306 by accessing the data storage 305 (as indicated by the dashed access line). If the statement receiver determines that a received xAPI statement already exists in the date storage 305 (affirmative outcome to detection step 305), the statement is ignored or rejected (step 304) and the statement processing ends (step 308), thereby conserving additional use of computational resources to further process the xAPI statement. But if the statement receiver determines that the received xAPI statement from a valid source does not already exist in the data storage 305 (negative outcome to detection step 305), the xAPI statement is stored in the data storage 305 (step 305) (as indicated by the dashed access line) and the statement processing ends (step 308).

Figure 14:
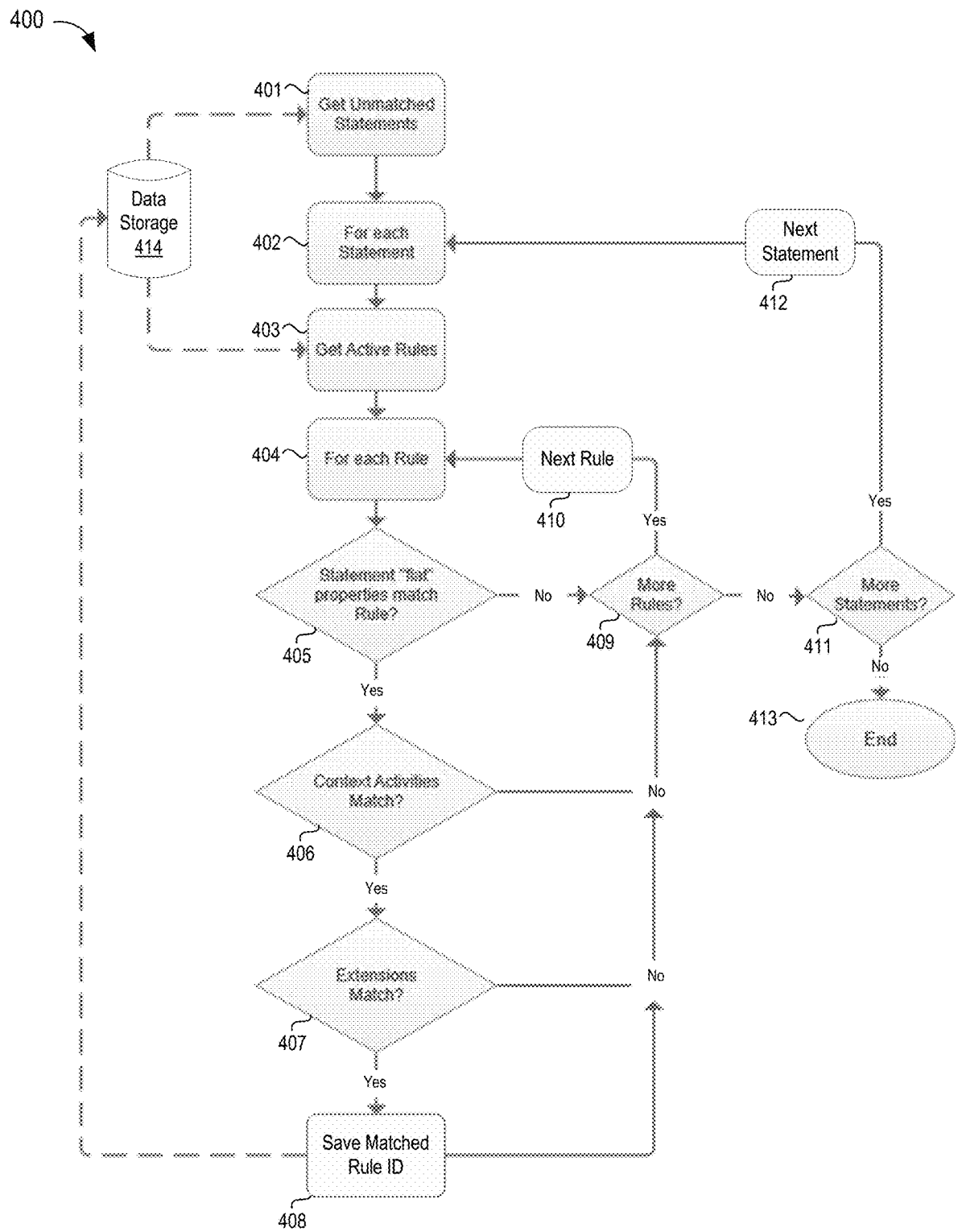
FIG. 14 is a simplified flow chart showing a sequence of steps for applying a rule matching process to input xAPI statements in accordance with selected embodiments of the present disclosure.

To provide additional details for an improved understanding of selected embodiments of the present disclosure, reference is now made to FIG. 14 which illustrates a simplified flow chart showing 400 showing the logic and processing sequence of steps for matching xAPI statements to trigger rules which may be implemented in the xAPI connection engine by a pattern matching engine. As will be appreciated, the depicted processing flow 400 may be implemented separately from the input statement processing sequence (such as shown in FIG. 13), such as by being run on a periodic basis or after new xAPI statements are received. However implemented, the processing flow sequence 400 starts at step 401 when the pattern matching engine retrieves unprocessed xAPI statements from the data storage 414. For each unprocessed xAPI statement (step 402), the pattern matching engine retrieves all active trigger rules associated with the Organization from the data storage 414 at step 403 (as indicated by the dashed access line). In such embodiments, the "active" trigger rules are the configured trigger rules which have the "Active" field/property checked. For each active trigger rule (step 404), the pattern matching engine compares one or more "flat" properties of the xAPI statement to the matching requirements of the trigger rule at step 405. In selected embodiments, a "flat" property of an xAPI statement refers to a property that appears only once in an xAPI statement (e.g., an "actor" or "verb" or "object") and does not have a logical or comparison operator. In other embodiments, the "flat" property of an xAPI statement that are compared to a trigger rule include only the "verb" or "object" properties of the xAPI statement, but do not include the "actor" property.

If the xAPI statement under test does not have flat properties that match the trigger rule (negative outcome to detection step 405), then the statement does not meet the matching requirements of the current trigger rule, and the trigger rule (and any associated trigger rule components) can be quickly discarded from further consideration. Next, the pattern matching engine checks to see if there are additional trigger rules to compare to the xAPI statement under test at step 409. If there are more trigger rules to evaluate against the xAPI statement under test (affirmative outcome to detection step 409), then the next trigger rule is retrieved (step 410) and the comparison sequence of steps 404-405 is repeated until there are no more trigger rules to evaluate against the xAPI statement under test (negative outcome to detection step 409), at which point the pattern matching engine determines if there any more xAPI statements to evaluate (step 411). If there are more xAPI statements to evaluate (affirmative outcome to detection step 411), then the next xAPI statement is retrieved (step 412) and the comparison sequence of steps 402-405 is repeated until there are no more trigger rules or xAPI statements to evaluate (negative outcome to detection step 411), at which point the pattern matching process ends (step 413).

Referring back to detection step 405, if the pattern matching engine determines that the xAPI statement under test does have all the flat properties that match the requirements of the trigger rule (affirmative outcome to detection step 405), then the xAPI statement is further evaluated for context activities that match the context activity requirements of the current trigger rule (step 406). If the xAPI statement under test does not meet the context activity requirements of the trigger rule (negative outcome to detection step 406), then the trigger rule (and any associated trigger rule components) can be discarded from further consideration, at which point the pattern matching process proceeds through steps 409-413 as described above. However, if the pattern matching engine determines that the xAPI statement under test does meet the context activity requirements of the trigger rule (affirmative outcome to detection step 406), then the xAPI statement is evaluated for extensions of any of the flat properties (e.g., object or result or context) that match extension requirements from the current trigger rule (step 407). If the xAPI statement under test does not meet the extension requirements from the current trigger rule (negative outcome to detection step 407), then the trigger rule (and any associated trigger rules) can be discarded from further consideration, at which point the pattern matching process proceeds through steps 409-413 as described above. However, if the pattern matching engine determines that the xAPI statement under test does meet the extension requirements from the current trigger rule (affirmative outcome to detection step 407), then the xAPI statement and matching trigger rule are identified and saved in the data storage 414 by storing a matched rule identifier (step 408) (as indicated by the dashed access line).

Figure 15:
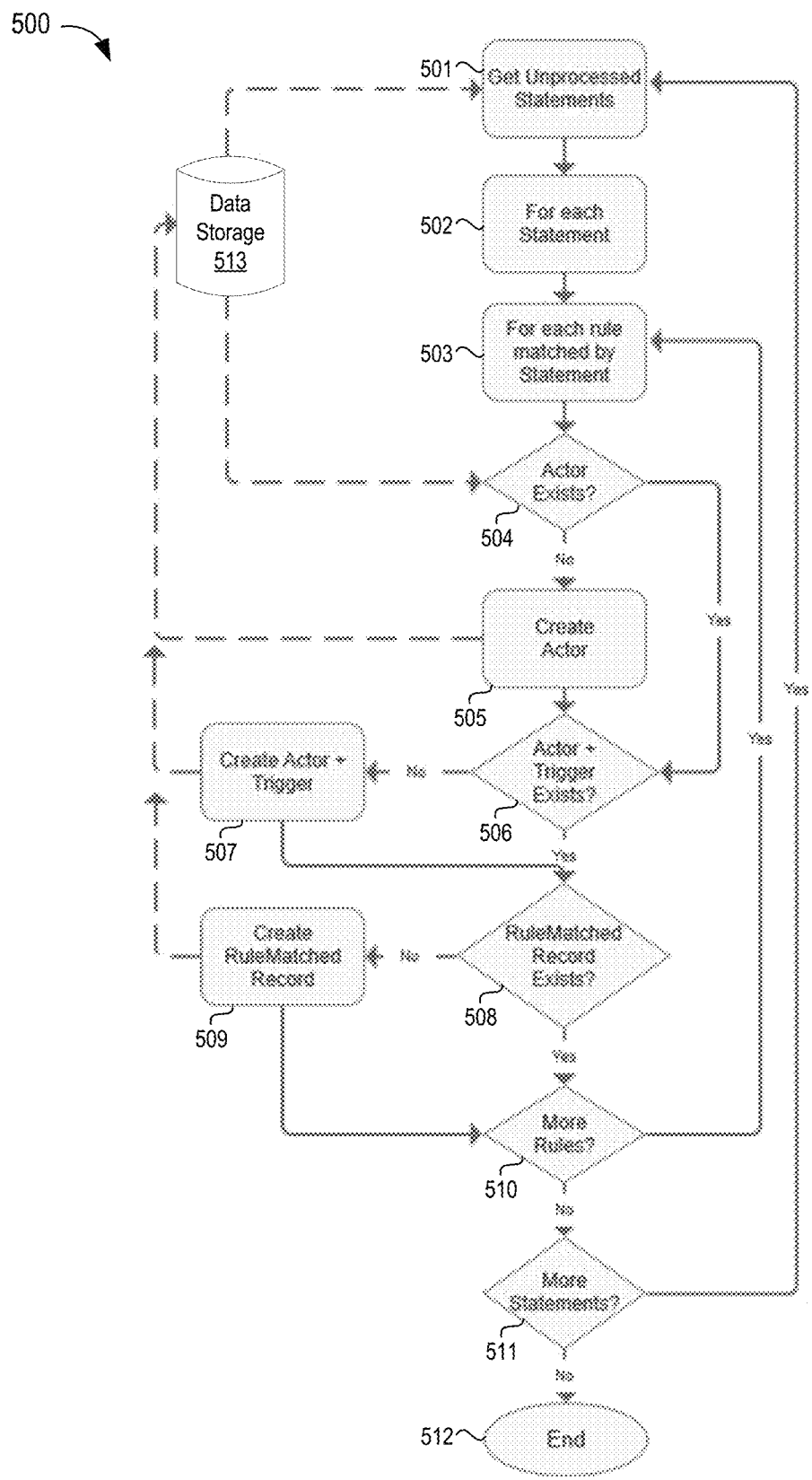
FIG. 15 is a simplified flow chart showing a sequence of steps for assigning matched rules to actors and triggers in accordance with selected embodiments of the present disclosure.

To provide additional details for an improved understanding of selected embodiments of the present disclosure, reference is now made to FIG. 15 which illustrates a simplified flow chart showing 500 showing the logic and processing sequence of steps for assigning matched rules to actors which may be implemented in the xAPI connection engine by a rule assignment engine. As will be appreciated, the depicted processing flow 500 may be implemented separately from the input statement processing sequence (such as shown in FIG. 13) and pattern matching engine (such as shown in FIG. 14), and may be run on a periodic basis or a new batch of xAPI statements are processed for pattern matching. The disclosed process for assigning triggers and matched rules to actors is required so that the trigger actions may be processed on a per-actor, per-trigger basis. For example, suppose that a trigger requires that three trigger rules must be met before the trigger's actions are fired, and suppose further that actors "Lisa" and "Carmen" currently have met two of the three required trigger rules. If an xAPI statement is received for actor "Carmen" that meets the requirements of the third trigger rule, then an outbound REST API call would be sent for Carmen, but not for Lisa.

However implemented, the processing flow sequence 500 starts at step 501 when the rule assignment engine retrieves unprocessed xAPI statements from the data storage 513 which have been matched to trigger rules but not to actors. For each unprocessed xAPI statement (step 502), the rule assignment engine processes the matching trigger rules at step 503 and accesses the data storage 513 (as indicated by the dashed access line) at step 504 to determine if an actor record has been created for the organization. If an actor already exists for the organization (affirmative outcome to detection step 504), then the process proceeds to detection step 506. However, if the rule assignment engine determines that there is no actor record listed in the data storage 513 (negative outcome to detection step 504), then an actor value is created step 505 and stored in the data storage 513 (as indicated by the dashed access line) before proceeding to detection step 506.

At detection step 506, the rule assignment engine checks to ensure that the combination of an actor plus the trigger (actor-trigger) record exists in the data storage 513. As disclosed herein, the actor-trigger record associates each actor with a trigger and any matching trigger rules required for that trigger's actions to be executed. If the actor-trigger record already exists (affirmative outcome to detection step 506), then there is a mechanism available for tracking which trigger rules for a trigger have been matched by xAPI statements associated with the actor, and the process proceeds to detection step 508. However, if the rule assignment engine determines that there is no actor-trigger record listed in the data storage 513 (negative outcome to detection step 506), then an actor-trigger record is created step 507 and stored in the data storage 513 (as indicated by the dashed access line) before proceeding to detection step 508. As disclosed, each actor-trigger record that is generated at step 507 matches actors to triggers, and is stored for subsequent processing.

At detection step 508, the rule assignment engine checks to ensure that the rule-matched record exists in the data storage 513. If the rule-matched record already exists (affirmative outcome to detection step 508), then the rule assignment engine proceeds to detect if there are more trigger rules to evaluate (step 510). However, if the rule assignment engine determines that there is not a rule-matched record listed in the data storage 513 (negative outcome to detection step 508), then a rule-matched record is created step 509 and stored in the data storage 513 (as indicated by the dashed access line) before proceeding to detection step 510.

At step 510, the rule assignment engine checks to see if there are additional trigger rules to compare to the xAPI statement under test. If there are more trigger rules to evaluate (affirmative outcome to detection step 510), then the next trigger rule is retrieved and processed with the sequence of steps 503-509 until there are no more trigger rules to evaluate (negative outcome to detection step 510), at which point the rule assignment engine determines if there any more xAPI statements to evaluate (step 511). If there are more xAPI statements to evaluate (affirmative outcome to detection step 511), then the next xAPI statement is retrieved (step 501) and processed with the sequence of steps 501-510 until there are no more trigger rules or xAPI statements to evaluate (negative outcome to detection step 511), at which point the rule assignment process ends (step 512). As seen from the foregoing, the rule assignment engine generates and stores, for each actor-trigger combination, a list of matched rules in the data storage 513.

Figure 16:
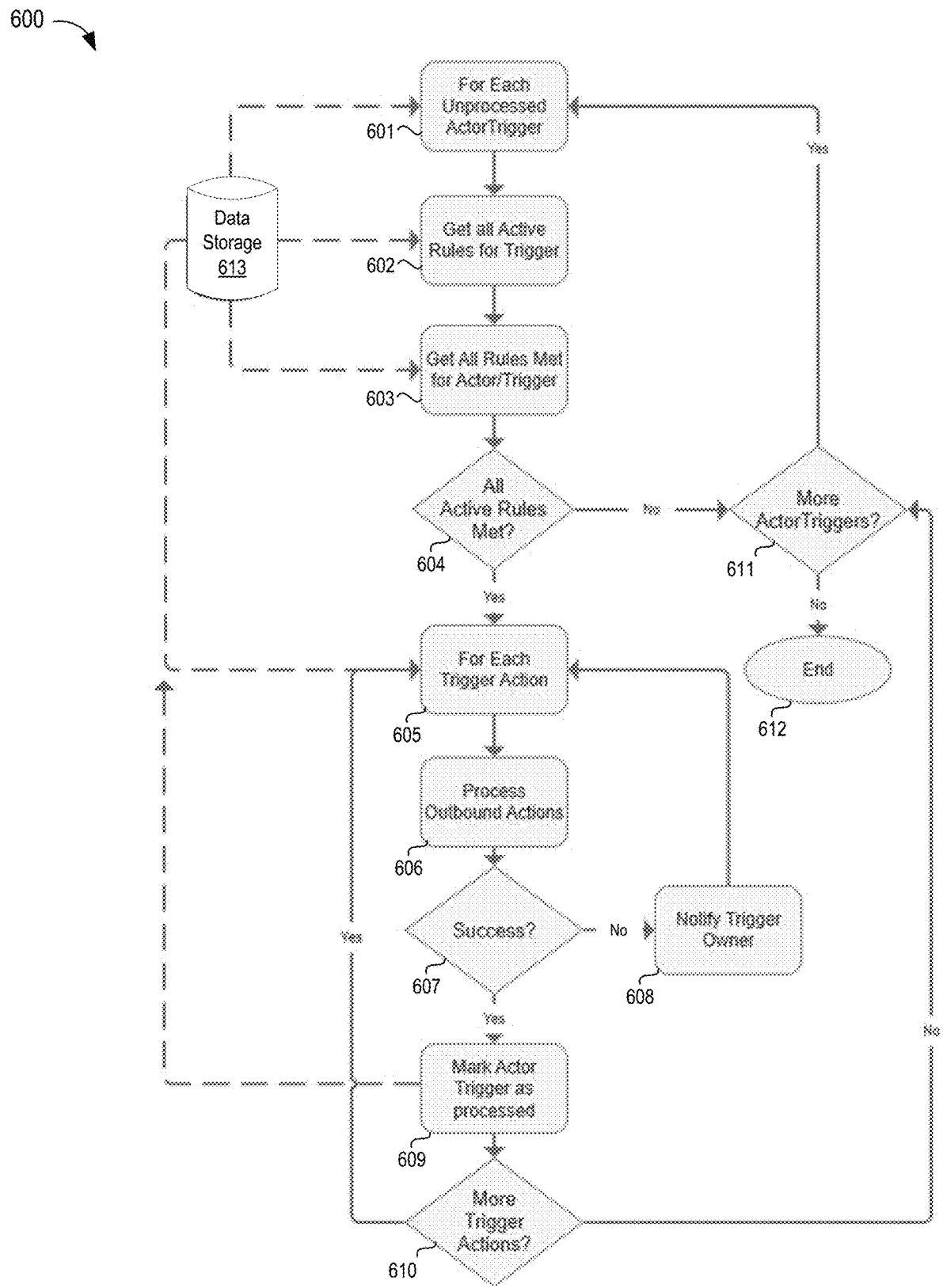
FIG. 16 is a simplified flow chart showing a sequence of steps for processing output REST API calls in accordance with selected embodiments of the present disclosure.

To provide additional details for an improved understanding of selected embodiments of the present disclosure, reference is now made to FIG. 16 which illustrates a simplified flow chart 600 showing the logic and processing sequence of steps for processing output REST API calls which may be implemented by an outbound REST API generator. As will be appreciated, the depicted processing flow 600 may be implemented separately from the input statement processing sequence (such as shown in FIG. 13), the pattern matching engine (such as shown in FIG. 14), and/or the rule assignment process (such as shown in FIG. 15), and may be run on a periodic basis or after a new batch of xAPI statements are processed for pattern matching and rule assignment. However implemented, the processing flow sequence 600 starts at step 601 when the outbound REST API generator retrieves unprocessed actor-trigger records from the data storage 613 which have not yet been processed to generate trigger actions. As disclosed, the retrieved actor-trigger records which match actors to triggers were generated at step 507 and stored in the data storage 513. For each unprocessed actor-trigger record (step 601), the outbound REST API generator accesses the data storage 613 (as indicated by the dashed access line) to retrieve all of the active trigger rules required for a specified trigger action (at step 602). In addition, the outbound REST API generator accesses the data storage 613 to retrieve all of the matched trigger rules corresponding to the unprocessed actor-trigger record (at step 603). At step 604, the outbound REST API generator determines if all the active trigger rules (from step 602) have been met by the matched trigger rules (from step 603). If all the active trigger rules have not been met by the matched trigger rules (negative outcome to detection step 604), then the outbound REST API generator determines if there are more actor-trigger records (affirmative outcome to detection step 611), in which case then the next actor-trigger record is retrieved and processed with the sequence of steps 601-604 until there are no more actor-trigger records to evaluate (negative outcome to detection step 611), at which point the outbound REST API generator process ends (step 612).

Referring back to detection step 604, if all the active trigger rules have been met by the matched trigger rules (affirmative outcome to detection step 604), then for each specified trigger action (step 605), the outbound REST API generator processes all the outbound REST API trigger actions (step 606), such as by automatically generating REST API calls with defined trigger action payloads to end points specified for the trigger action in question when there is a match between the matching trigger rule(s) for an actor and the active trigger rules for each trigger. As disclosed herein, the outbound REST API trigger actions may include a data payload that includes not only data received in xAPI statements, but also other properties and information.

At step 607, the outbound REST API generator detects whether the outbound REST API trigger actions were successfully processed by the third-party application. If not (negative outcome to detection step 607), the trigger owner is notified of the failure at step 608, and the sequence of steps 605-607 are repeated again. However, if the outbound REST API trigger action was successfully received by the third-party application (affirmative outcome to detection step 607), then the actor-trigger record is marked in the data storage 613 (as indicated by the dashed access line) as processed at step 609.

At step 610, the outbound REST API generator determines if there are more trigger actions to process. If there are additional trigger actions to process (affirmative outcome to detection step 610), then then the next trigger action is retrieved and processed with the sequence of steps 605-609 until there are no more trigger actions to process (negative outcome to detection step 610), at which point the outbound REST API generator determines if there are more actor-trigger records (affirmative outcome to detection step 611), in which case then the next actor-trigger record is retrieved and processed with the sequence of steps 601-604 until there are no more actor-trigger records to evaluate (negative outcome to detection step 611), at which point the outbound REST API generator process ends (step 612).

Figure 17:
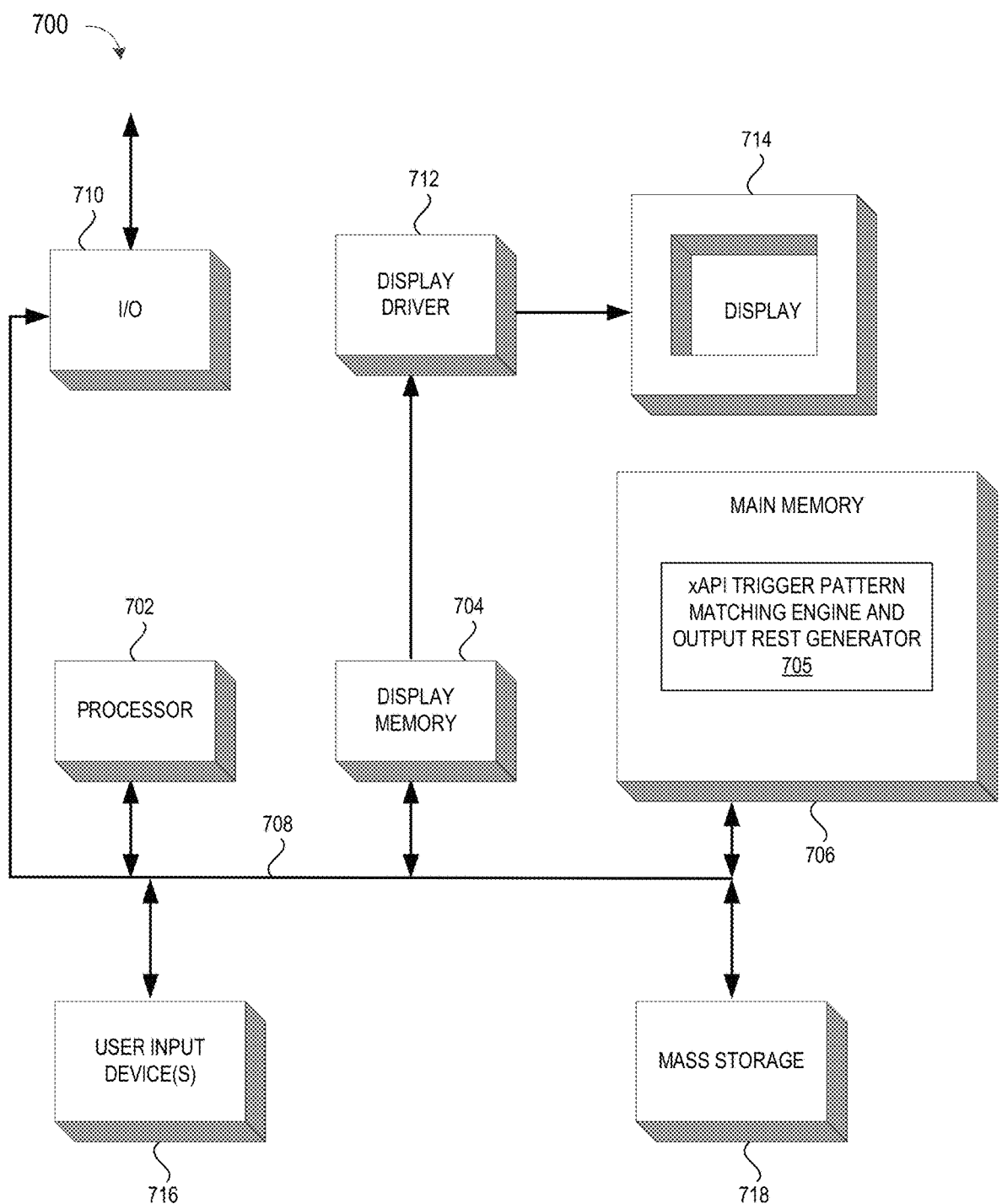
FIG. 17 is a simplified block diagram of a general-purpose computer for executing a xAPI trigger pattern matching engine and output REST generator in accordance with selected embodiments of the present disclosure.

Embodiments of the system and method for using an xAPI trigger pattern matching engine and output REST generator to automatically generate outbound xAPI statements to third-party applications can be implemented on a computer system, such as a general-purpose computer 700 illustrated in FIG. 17. As disclosed the computer 700 includes input user device(s) 716, such as a keyboard and/or mouse, which are coupled to a bi-directional system bus 708. The input user device(s) 716 are used for introducing user input to the computer system 700 and communicating that user input to processor 702. The computer system 700 may also include a display memory 704, main memory 706, and mass storage 718, all coupled to bi-directional system bus 708 along with input user device(s) 716 and processor 702. The mass storage 718 may include both fixed and removable media, such as other available mass storage technology. Bus 708 may contain, for example, 32 address lines for addressing display memory 704 or main memory 706. The system bus 708 may also include, for example, an n-bit data bus for transferring data between and among the components, such as CPU 702, main memory 706, display memory 714, and mass storage 718, where "n" is, for example, 32 or 74. Alternatively, multiplex data/address lines may be used instead of separate data and address lines.

The computer 700 may also include I/O device(s) 710 which provide connections to peripheral devices, such as a printer, and may also provide a direct connection to remote server computer systems via a telephone link or to the Internet via an ISP. I/O device(s) 710 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 718 until loaded into main memory 706 for execution. Computer programs may also be in the form of electronic signals modulated in accordance with the computer program and data communication technology when transferred via a network. The method and functions relating to system and method for assessing received xAPI statements against multiple trigger rules to update third party applications using output representational state transfer (REST) APIs upon determining that defined conditions from the trigger rules are met by the received xAPI data may be implemented in a computer program for an xAPI trigger pattern matching engine and output REST generator 705.

The processor 702, in one embodiment, is a microprocessor manufactured by Motorola Inc., Intel Corporation, Advanced Micro Devices, or any microprocessor manufacturer. However, any other suitable single or multiple microprocessors or microcomputers may be utilized. Main memory 706 is comprised of dynamic random access memory (DRAM). Display memory 704 is a dual-ported random access memory. One port of the memory 704 is coupled to display amplifier or driver 712. The display amplifier/drive 712 is used to drive the display 714. Display amplifier/drive 712 is well known in the art and may be implemented by any suitable means. This circuitry converts pixel data stored in display memory 704 to a raster signal suitable for use by display 714. Display 714 is a type of monitor suitable for displaying graphic images.

By now, it will be appreciated that there is disclosed herein a system, method, apparatus, and computer program product comprising at least one non-transitory recordable medium having stored thereon executable instructions and data which, when executed by a processor at an information handling system, causes the system to enhance operable functionality of xAPI statements by performing a method at a device having a processor and memory. The disclosed system, method, computer program code, and apparatus are connected and configured to receive a plurality of input xAPI statements from a plurality of different xAPI sources (e.g., Learning Record Store (LRS) or Learning Record Provider (LRP) systems) and to then evaluate the plurality of input xAPI statements to identify a first plurality of authorized xAPI statements. Alternatively, a plurality of xAPI statements generated by a plurality of different xAPI statement sources may be identified or retrieved by the system. In addition, the disclosed system, method, computer program code, and apparatus sequentially compares each of the first plurality of authorized xAPI statements against a plurality of trigger rules by using a pattern matching process which evaluates matching xAPI data properties and logical and/or comparative operator requirements from each trigger rule against each authorized xAPI statement, thereby generating one or more matching trigger rules having xAPI data properties and logical and/or comparative operator requirements that are matched by one or more authorized xAPI statements. In selected embodiments, the plurality of trigger rules includes a first trigger rule which includes a parent trigger rule component specifying one or more flat properties of an xAPI statement that can be determined by reading and matching selected properties from a base level of the xAPI statement, and which includes an additional trigger rule component specifying one or more additional properties of the xAPI statement. In selected embodiments, the additional trigger rule component may specify one or more context activities with properties for the xAPI statement being compared to an additional trigger rule component. In other selected embodiments, the additional trigger rule component may specify one or more extensions with properties for the xAPI statement being compared to the additional trigger rule component. In selected embodiments, the pattern matching process evaluates, from each trigger rule, one or more xAPI properties selected from the group consisting of verb, object, result, context, and extension properties against each authorized xAPI statement, but does not evaluate an xAPI actor property against each authorized xAPI statement. In other selected embodiments, the pattern matching process evaluates one or more xAPI flat properties from each trigger rule against each input xAPI statement. In addition or in the alternative, the pattern matching process evaluates one or more xAPI context activity properties from each trigger rule against each input xAPI statement. In addition or in the alternative, the pattern matching process evaluates one or more xAPI extension properties from each trigger rule against each input xAPI statement. In addition or in the alternative, the pattern matching process may be applied to evaluate one or more of an xAPI verb property, xAPI object property, xAPI result property, xAPI context property, or xAPI extension property from each trigger rule against each xAPI statement. In selected embodiments, the disclosed system, method, computer program code, and apparatus may assign each of the one or more matching trigger rules to an actor, thereby creating an actor-trigger record. The disclosed system, method, computer program code, and apparatus also evaluates one or more required trigger rules associated with a first trigger against the one or more matching trigger rules assigned to the actor. In addition, the disclosed system, method, computer program code, and apparatus automatically generates one or more outbound REST API calls to communicate with one or more third-party applications upon detecting that the one or more required trigger rules are matched by the one or more matching trigger rules assigned to the actor. In selected embodiments, the system automatically generates the outbound REST API call(s) to communicate with the third-party application(s) to document accomplishments, qualifications or deficiencies, document competence, update information in Human Capital Management, Customer Relationship Management and other enterprise systems or grant/revoke access to facilities and data. In other embodiments, the system automatically generates the outbound REST API call(s) by sending, to the third-party application(s), a forwarded xAPI statement or a transformed xAPI statement or a constructed xAPI statement that combines elements of xAPI statements which match the xAPI data properties and logical and/or comparative operator requirements from the one or more matching trigger rules. In selected embodiments, a statement receiver may receive and evaluate the plurality of input xAPI statements, and a pattern matching engine may separately perform the steps for sequentially comparing each of the first plurality of authorized xAPI statements against the plurality of trigger rules. In addition, an outbound REST generator may separately evaluate the one or more required trigger rules associated with the first trigger against the one or more matching trigger rules for an actor before automatically generating one or more outbound REST API calls.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically generate outbound REST calls to third-party applications using an xAPI trigger pattern matching engine and output REST generator which are configured to assess received xAPI statements against multiple trigger rules to detect when defined conditions from the trigger rules are met by the received xAPI data, thereby providing code-free system interoperability between LRS and LRP systems and non-xAPI third-party applications. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. As described herein, embodiments of the present disclosure may be a system, a method, and/or a computer program product. The computer program product may include a non-transitory computer readable storage medium (or media) having computer readable program instructions thereon for causing a processor to carry out aspects of the present invention. Thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for connecting xAPI statements with third party applications using representational state transfer APIs may be implemented in any type of computer system or programming or processing environment.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed by a device having a processor and memory for enhancing operable functionality of xAPI statements, comprising:
   receiving, by the device, a plurality of input xAPI statements from a plurality of different xAPI statement sources;
   evaluating, by the device, the plurality of input xAPI statements to identify a first plurality of authorized xAPI statements;
   sequentially comparing, by the device, each of the first plurality of authorized xAPI statements against a plurality of trigger rules by using a pattern matching process which evaluates matching xAPI data properties and logical and/or comparative operator requirements from each trigger rule against each authorized xAPI statement, thereby generating one or more matching trigger rules having xAPI data properties and logical and/or comparative operator requirements that are matched by one or more authorized xAPI statements;
   evaluating, by the device, one or more required trigger rules associated with a trigger against the one or more matching trigger rules for an actor; and
   automatically generating, by the device, one or more outbound REST API calls to communicate with one or more third-party applications upon detecting that the one or more required trigger rules associated with the trigger are matched by the one or more matching trigger rules.

2. The method of claim 1, where the pattern matching process evaluates, from each trigger rule, one or more xAPI properties selected from the group consisting of verb, object, result, context, and extension properties against each authorized xAPI statement, but does not evaluate an xAPI actor property against each authorized xAPI statement.

3. The method of claim 2, further comprising assigning, by the device, each of the one or more matching trigger rules to an actor.

4. The method of claim 1, where the plurality of trigger rules comprises a trigger rule comprising:
   a parent trigger rule component specifying one or more flat properties of an xAPI statement that can be determined by reading and matching selected properties from a base level of the xAPI statement; and
   an additional trigger rule component specifying one or more additional properties of the xAPI statement.

5. The method of claim 4, where the additional trigger rule component specifies one or more context activities with properties for the xAPI statement being compared to the additional trigger rule component.

6. The method of claim 4, where the additional trigger rule component specifies one or more extensions with properties for the xAPI statement being compared to the additional trigger rule component.

7. The method of claim 1, where a statement receiver receives and evaluates the plurality of input xAPI statements, and where a pattern matching engine performs the steps for sequentially comparing each of the first plurality of authorized xAPI statements against the plurality of trigger rules.

8. The method of claim 7, where an outbound REST generator evaluates the one or more required trigger rules associated with trigger against the one or more matching trigger rules for an actor before automatically generating one or more outbound REST API calls.

9. A computer program product comprising at least one non-transitory recordable medium having stored thereon executable instructions and data which, when executed by a processor at an information handling system, causes the system to enhance operable functionality of xAPI statements by:

identifying, receiving or retrieving, by the system, a plurality of xAPI statements generated by a plurality of different xAPI statement sources;

sequentially comparing, by the system, each of the plurality of xAPI statements against a plurality of trigger rules by using a pattern matching process which evaluates matching xAPI data properties and logical and/or comparative operator requirements from each trigger rule against each xAPI statement, thereby generating one or more matching trigger rules having xAPI data properties and logical and/or comparative operator requirements that are matched by one or more xAPI statements from the plurality of xAPI statements;

evaluating, by the system, one or more required trigger rules associated with a trigger against the one or more matching trigger rules for an actor; and automatically generating, by the system, one or more outbound REST API calls to communicate with one or more third-party applications upon detecting that the one or more required trigger rules associated with the trigger are matched by the one or more matching trigger rules.

10. The computer program product of claim 9, further comprising computer instructions that, when executed by the processor, cause the system to identify, receive or retrieve the plurality of xAPI statements by:

receiving, by the system, a plurality of input xAPI statements from the plurality of different xAPI statement sources; and evaluating, by the system, the plurality of input xAPI statements against predetermined credential or authorization information received from each xAPI statement source to identify the plurality of xAPI statements.

11. The computer program product of claim 9, further comprising computer instructions that, when executed by the processor, cause the system to sequentially compare each xAPI statement from the plurality of xAPI statements against the plurality of trigger rules by applying the pattern matching process to evaluate one or more of an xAPI verb property, xAPI object property, xAPI result property, xAPI context property, or xAPI extension property from each trigger rule against each xAPI statement.

12. The computer program product of claim 11, further comprising computer instructions that, when executed by the processor, cause the system to assign each of the one or more matching trigger rules to an actor.

13. The computer program product of claim 9, where the plurality of trigger rules comprises a first trigger rule comprising:

a parent trigger rule component specifying one or more flat properties of an xAPI statement that can be determined by reading and matching selected properties from a base level of the xAPI statement; and an additional trigger rule component specifying one or more additional properties of the xAPI statement.

14. The computer program product of claim 13, where additional trigger rule component specifies one or more context activity properties or extension properties for the xAPI statement being compared to the additional trigger rule component.

15. The computer program product of claim 9, further comprising computer instructions that, when executed by the processor, cause the system to automatically generate one or more outbound REST API calls to communicate with one or more third-party applications to document accomplishments, qualifications or deficiencies, document competence, update information in Human Capital Management, Customer Relationship Management and other enterprise systems or grant/revoke access to facilities and data.

16. The computer program product of claim 9, further comprising computer instructions that, when executed by the processor, cause the system to automatically generate one or more outbound REST API calls by sending, to the one or more third-party applications, a forwarded xAPI statement or a transformed xAPI statement or a constructed xAPI statement that combines elements of xAPI statements which match the xAPI data properties and logical and/or comparative operator requirements from the one or more matching trigger rules.

17. A system comprising:

one or more processors;

a memory coupled to at least one of the processors; and a set of instructions stored in the memory and executed by at least one of the processors to enhance operable functionality of xAPI statements, wherein the set of instructions are executable to perform actions of:

receiving or retrieving a plurality of input xAPI statements generated by a plurality of different xAPI statement sources;

sequentially comparing each of the plurality of input xAPI statements against a plurality of trigger rules by using a pattern matching process which evaluates matching xAPI data properties and logical and/or comparative operator requirements from each trigger rule against each input xAPI statement, thereby identifying one or more matching trigger rules having xAPI data properties and logical and/or comparative operator requirements that are matched by one or more input xAPI statements;

assigning each of the one or more matching trigger rules to an actor;

evaluating one or more required trigger rules associated with a trigger against the one or more matching trigger rules assigned to the actor; and automatically generating one or more outbound REST API calls to communicate with a third-party application upon detecting that the one or more required trigger rules associated with the trigger are matched by the one or more matching trigger rules assigned to the actor.

18. The system of claim 17, where the pattern matching process evaluates one or more xAPI flat properties from each trigger rule against each input xAPI statement.

19. The system of claim 17, where the pattern matching process evaluates one or more xAPI context activity properties from each trigger rule against each input xAPI statement.

20. The system of claim 17, where the pattern matching process evaluates one or more xAPI extension properties from each trigger rule against each input xAPI statement.

\* \* \* \* \*